United States Patent
Sinnarajah et al.

(10) Patent No.: US 8,086,169 B2
(45) Date of Patent: *Dec. 27, 2011

(54) METHOD AND APPARATUS FOR SWITCHING BETWEEN SHARED AND INDIVIDUAL CHANNELS TO PROVIDE BROADCAST CONTENT SERVICES IN A WIRELESS TELEPHONE NETWORK

(75) Inventors: Ragulan Sinnarajah, San Diego, CA (US); Jun Wang, San Diego, CA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,081

(22) Filed: Apr. 30, 2010

(65) Prior Publication Data

US 2011/0130086 A1    Jun. 2, 2011

Related U.S. Application Data

(63) Continuation of application No. 11/851,750, filed on Sep. 7, 2007, now Pat. No. 7,738,832, which is a continuation of application No. 10/278,485, filed on Oct. 22, 2002, now Pat. No. 7,283,782.

(51) Int. Cl.
*H04H 1/00* (2006.01)
(52) U.S. Cl. ....... 455/3.01; 455/436; 455/442; 370/329; 370/352; 370/437
(58) Field of Classification Search ................ 455/436, 455/437, 438, 442, 455; 370/229, 232, 328, 370/329, 335, 336, 331, 352, 353, 431, 437
See application file for complete search history.

(56) References Cited

U.S. PATENT DOCUMENTS

| | | | |
|---|---|---|---|
| 5,203,010 | A | 4/1993 | Felix et al. |
| 5,530,917 | A | 6/1996 | Andersson et al. |
| 5,805,995 | A | 9/1998 | Jiang et al. |
| 5,915,221 | A | 6/1999 | Sawyer et al. |

(Continued)

FOREIGN PATENT DOCUMENTS

KR    20010108485    12/2001

(Continued)

OTHER PUBLICATIONS

3G TR 25.922 V3.1.0 (Mar. 2000), "3rd Generation Partnership Project: Technical Specification Group Radio Access Network; Radio Resource Management Strategies, (Release 1999)," Mar. 2000, pp. 1-59.
International Search Report, PCT/US03/033684, International Search Authority, European Patent Office, Nov. 10, 2004.
International Preliminary Report on Patentability—PCT/US03/033684, IPEA—US, Aug. 16, 2007.

(Continued)

*Primary Examiner* — Sujatha Sharma
(74) *Attorney, Agent, or Firm* — Rupit M. Patel

(57) ABSTRACT

A wireless communications network (100) includes various base stations (110) and subscriber-stations (114). The base stations each provide (602) broadcast content services to subscriber-stations over communication channels of one of the following types: 1) shared channels for use by multiple subscriber-stations, 2) individual channels each dedicated for use by an individual subscriber-station. In response to one or more prescribed condition changes (604), there is a switch (606) in the type of communications channel used to provide broadcast content services to one or more given subscriber-stations.

18 Claims, 19 Drawing Sheets

U.S. PATENT DOCUMENTS

| | | |
|---|---|---|
| 6,223,043 B1 | 4/2001 | Hazama |
| 6,347,091 B1 | 2/2002 | Wallentin et al. |
| 6,507,567 B1 | 1/2003 | Willars |
| 6,590,880 B1 | 7/2003 | Maenpaa et al. |
| 6,760,303 B1 | 7/2004 | Brouwer |
| 6,829,482 B2 | 12/2004 | Rune et al. |
| 6,876,636 B2 | 4/2005 | Sinnarajah et al. |
| 6,909,702 B2 | 6/2005 | Leung et al. |
| 6,980,820 B2 | 12/2005 | Sinnarajah et al. |
| 7,035,820 B2 | 4/2006 | Ben-Efraim et al. |
| 7,277,694 B2 | 10/2007 | Sinnarajah et al. |
| 7,283,782 B2 | 10/2007 | Sinnarajah et al. |
| 7,349,425 B2 | 3/2008 | Leung et al. |
| 2003/0035389 A1 | 2/2003 | Chen et al. |
| 2003/0054807 A1 | 3/2003 | Hsu et al. |
| 2004/0131075 A1 | 7/2004 | Sinnarajah et al. |

FOREIGN PATENT DOCUMENTS

| | | |
|---|---|---|
| WO | 9837723 | 8/1998 |
| WO | 9952307 | 10/1999 |
| WO | 0054521 | 9/2000 |
| WO | 0062572 | 10/2000 |
| WO | 0176304 | 10/2001 |

OTHER PUBLICATIONS

3GPP: "3rd Generation Partnership Project; Technical Specification Group Radio Access Network; Introduction of the Multimedia Broadcast Multicast Service (MBMS) in the Radio Access Network (Stage-2); (Release 6); 3GPP TS 25.346 v 1 . 1 .0" , 3GPP TS 25.346 V 1.1.0 . XX. XX, May 1, 2002, pp. 1-11, XP002260225.

European Search Report—EP09161980, Search Authority—Munich Patent Office, Jun. 10, 2011.

Nokia: "MBMS in Idle and RRC connected Mode", 3GPP Draft; R2-021848 MBMS connected-Idle, 3rd Generation Partnership Project (3GPP), Mobile Competence Centre ; 650, Route Des Lucioles ; F-06921 Sophia-Antipolis Cedex ; France, vol. RAN WG2, no. Stockholm, Sweden; Aug. 15, 2002, XP050121436, [retrieved on Aug. 15, 2002].

Translation of Office Action in Korean application 10-2005-7007064 corresponding to U.S. Appl. No. 12/772,081, citing WO0062572, WO0176304 and KR20010108485 dated Apr. 29, 2011.

IDLE MESSAGING

ACCESS MESSAGING

TRAFFIC MESSAGING

SHARED-TO-INDIVIDUAL HANDOFF
OPERATION OF (SHARED) BASE STATION
(FIRST EMBODIMENT)

SHARED-TO-INDIVIDUAL HANDOFF
OPERATION OF (INDIV.) BASE STATION
(FIRST EMBODIMENT)

SHARED-TO-INDIVIDUAL HANDOFF
OPERATION OF (SHARED) BASE STATION
(SECOND EMBODIMENT)

SHARED-TO-INDIVIDUAL HANDOFF
OPERATION OF (INDIV.) BASE STATION
(SECOND EMBODIMENT)

INDIVIDUAL-TO-SHARED HANDOFF
OPERATION OF (INDIVIDUAL) BASE STATION
(FIRST EMBODIMENT)

INDIVIDUAL-TO-SHARED HANDOFF
OPERATION OF (SHARED) BASE STATION
(FIRST EMBODIMENT)

INDIVIDUAL-TO-SHARED HANDOFF
OPERATION OF (INDIVIDUAL) BASE STATION
(SECOND EMBODIMENT)

INDIVIDUAL-TO-SHARED HANDOFF
OPERATION OF (SHARED) BASE STATION
(SECOND EMBODIMENT)

INITIATION OF P2P CALL DURING SHARED BROADCAST OPERATION OF REMOTE

CHANGE BETWEEN SHARED/INDIV. BROADCAST DUE
TO CHANGE IN NETWORK CONDITIONS
(BASE STATION OPERATIONS)

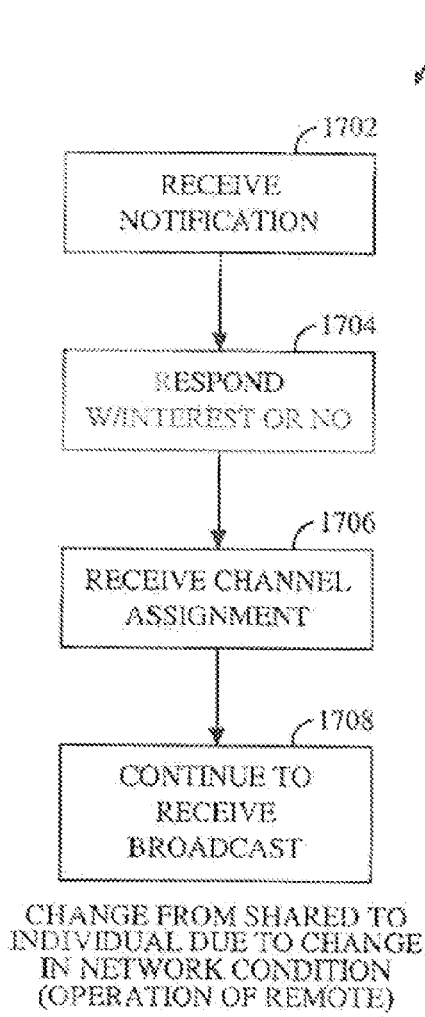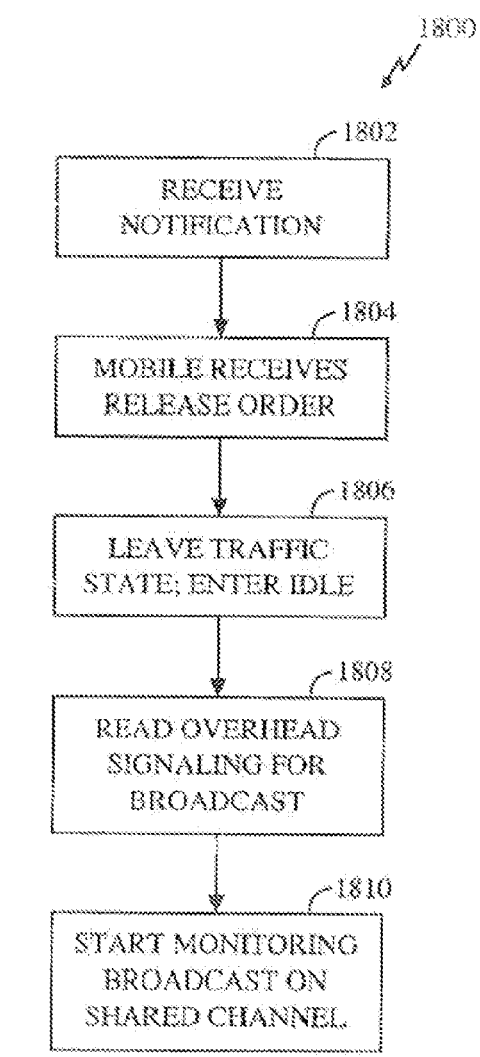
FIG. 17
FIG. 18

METHOD AND APPARATUS FOR SWITCHING BETWEEN SHARED AND INDIVIDUAL CHANNELS TO PROVIDE BROADCAST CONTENT SERVICES IN A WIRELESS TELEPHONE NETWORK

CROSS REFERENCE TO RELATED APPLICATION

Claim of Priority Under 35 U.S.C. §120

The present Application for Patent is a continuation of patent application Ser. No. 11/851,750 entitled Method And Apparatus For Switching Between Shared And Individual Channels To Provide Broadcast Content Services In A Wireless Telephone Network, filed on Sep. 7, 2007, now allowed, which is a continuation of U.S. Pat. No. 7,283,782 entitled "Method and Apparatus for Switching Between Shared and Individual Channels to Provide Broadcast Content Service in a Wireless Telephone Network", issued on Oct. 16, 2007 and assigned to the assignee hereof and hereby expressly incorporated by reference here.

BACKGROUND

1. Field

The present invention generally relates to wireless telephone networks with added capacity for delivering broadcast content. More particularly, the invention concerns the use of both group (shared) and individual (dedicated) channels for delivering broadcast content, and the operations of switching between use of shared/individual channels when appropriate.

2. Background

Many communication systems transmit information signals from an origination station to a physically distinct destination station. The information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, that is, simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), amplitude modulation multiple-access (AM), and code division multiple-access (CDMA) spread spectrum. Multiple-access communication systems may be wireless or wireline and may carry voice and/or data.

In a multiple-access wireless communication system, communications between users are conducted through one or more base stations. In one example, one user on a first wireless subscriber-station communicates with another user on a second wireless subscriber-station by transmitting data on a reverse link to a base station. The base station receives the data and, if necessary, routes the data to another base station. Ultimately, the data is transmitted on a forward link of the final base station to the second subscriber-station. "Forward" link refers to transmission from a base station to a wireless subscriber-station and the "reverse" link refers to transmission from a wireless subscriber-station to a base station. In many communication systems, the forward link and the reverse link utilize separate frequencies. Communication can also be conducted between one user on a wireless subscriber-station and another user on a landline station. In this case, a base station receives the data from the subscriber-station on a reverse link, and routes the data through a public switched telephone network (PSTN) to the landline station. Communications also occur in the opposite direction. The foregoing wireless communication services are examples of "point-to-point" communication service. In contrast, "broadcast" services deliver information from a central station to multiple subscriber-stations ("multipoint"). The basic model of a broadcast system consists of a broadcast net of users served by one or more central stations, which transmit news, movies, sports, or other "content" to the users. Here, each subscriber-station monitors a common broadcast forward link signal. Because the central station fixedly determines the content, the users do not generally communicate back. Examples of common usage of broadcast services communication systems are television, radio, and the like. Such communication systems are generally highly specialized.

With recent advancements in wireless telephone systems, there has been growing interest in using the existing, chiefly point-to-point wireless telephone infrastructure to additionally deliver broadcast services. In this respect, a number of important advances have been made by QUALCOMM CORPORATION of San Diego, Calif. The following references describe various QUALCOMM advances relating to the use of shared communications channels to deliver broadcast content in a wireless telephone network.

U.S. Pat. No. 6,980,820, issued on Dec. 27, 2005, in the names of Sinnarajah et al. and entitled "METHOD AND APPARATUS FOR SIGNALLING IN BROADCAST COMMUNICATIONS SYTEM." U.S. patent application Ser. No. 10/192,132, filed on Jul. 9, 2002 and entitled "METHOD AND SYSTEM FOR MULTICAST SERVICE INITIATION IN A COMMUNICATION SYSTEM." U.S. patent application Ser. No. 09/933,912, filed on Aug. 20, 2001, now allowed, and entitled "METHOD AND SYSTEM FOR UTILIZATION OF AN OUTER DECODER IN A BROADCAST SERVICES COMMUNICATIONS SYSTEM." U.S. Pat. No. 7,349,425, issued on Mar. 25, 2008, and entitled "METHOD AND APPARATUS FOR OVERHEAD MESSAGING IN A WIRELESS COMMUNICATION SYSTEM." The entirety of the foregoing references is hereby incorporated by reference into the present disclosure.

With still another twist to the concept of using wireless telephony networks to deliver broadcast content, the following reference describes the use of individual communications channels to deliver broadcast content using "point-to-point" calls: U.S. Pat. No. 7,277,694, issued on Oct. 2, 2007, filed concurrently herewith in the names of Ragulan Sinnarajah et al entitled "METHOD AND APPARATUS FOR COMMENCING SHARED OR INDIVIDUAL TRANSMISSION OF BROADCAST CONTENT IN A WIRELESS TELEPHONE NETWORK." The entirety of the foregoing reference is hereby incorporated by reference into the present disclosure.

Although the foregoing applications are satisfactory in many respects, the present inventors have discovered the previously unknown possibility of delivering broadcast content with a combination of shared and individual channels, depending upon which is most advantageous under the circumstances. This approach, as discovered by the present inventors, presents a number of unique challenges, since the use of both shared and individual broadcast communication channels is unknown in the prior art.

SUMMARY

A wireless communications network includes various base stations and subscriber-stations. The base stations each provide broadcast content services to subscriber-stations over communication channels of the following types: 1) shared channels for use by multiple subscriber-stations, 2) individual channels each dedicated for use by an individual subscriber-station. In response to one or more prescribed condition changes, there is a switch in the type of communications channel used to provide a given program of broadcast content to one or more subscriber-stations.

BRIEF DESCRIPTION OF THE DRAWINGS

FIGS. 17-18 are flowcharts showing operations of a subscriber-station undergoing a change in broadcast channel type dictated by a base station in accordance with FIG. 16.

DETAILED DESCRIPTION

The nature, objectives, and advantages of the invention will become more apparent to those skilled in the art after considering the following detailed description in connection with the accompanying drawings.

Hardware Components & Interconnections

Introduction

As mentioned above, the present disclosure utilizes a wireless communications network with various base stations and subscriber-stations, among other components. Each base station provides broadcast content services to subscriber-stations using communication channels of the following types: 1) shared channels for use by multiple subscriber-stations, 2) individual channels each dedicated for use by an individual subscriber-station. In response to one or more prescribed condition changes, there is a switch in the type of communications channel used to provide a given program of broadcast content to one or more subscriber-stations.

Further detail is provided below concerning the overall design and operation of this system, as well as its various components.

Wireless Communications System

Figure 1:
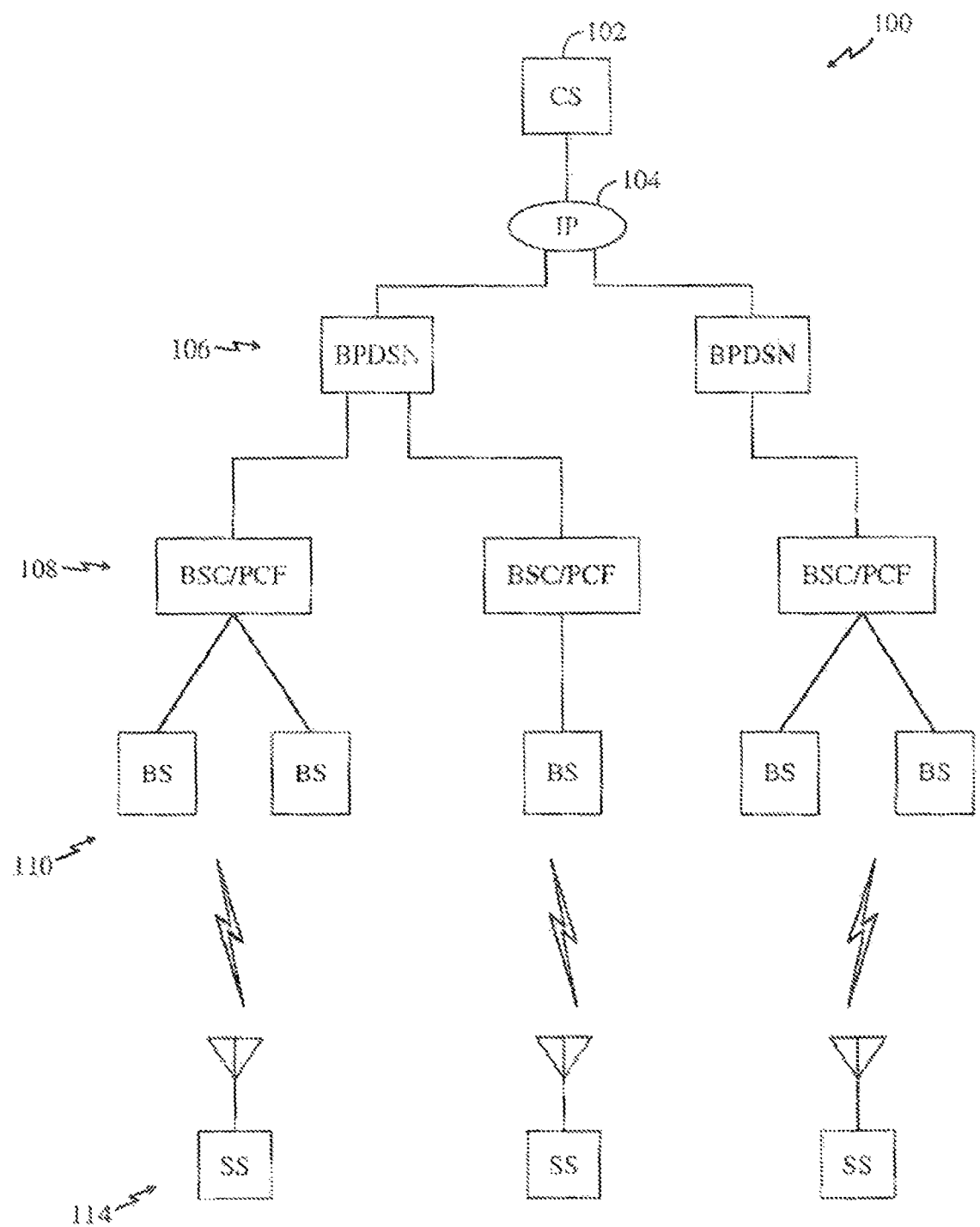
FIG. 1 is a block diagram of some hardware components and interconnections in a wireless communications network.

According to an exemplary model of a broadcast system, a number of subscriber-stations are served by one or more base stations that transmit broadcast content such as news, movies, sports events, and the like. FIG. 1 illustrates block diagram of a communication system 100, capable of performing high-speed broadcast service (HSBS) under various embodiments of the present invention.

Broadcast content originates at one or more content servers (CSs) 102. The content server 102 comprises one or more digital data processing machines such as a personal computer, computer workstation, mainframe computer, computer network, microprocessor, or other computing facility to deliver packet-formatted (or other formatted) broadcast content to broadcast-packet-data-serving-nodes (BPDSN) 106 via Internet connection 104 or other (not shown) non-Internet network or direct connection. Depending upon the manner of implementation, the nodes 106 may the same or different hardware as packet data switching nodes (PDSNs) of the type that are well known in wireless telephony. According to each packet's destination, a node 106 delivers the packet to an appropriate packet control function (PCF) module 108. Each module 108 controls various functions of base stations 110 related to delivery of high speed broadcast services. Among other functions, the modules 108 forward broadcast packets to the base stations 110. Each module 108 may utilize the same or different hardware as a base station controller (BSC).

The base stations 110 deliver broadcast content and conventional wireless telephone calls to subscriber-stations 114. The base stations 110 may be implemented using hardware such as that used by conventional base stations in commercially use today.

Exemplary Digital Data Processing Apparatus

Data processing entities such as components 102, 106, 108, 110, 114 (FIG. 1), or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Wireless Telephone

Figure 3:
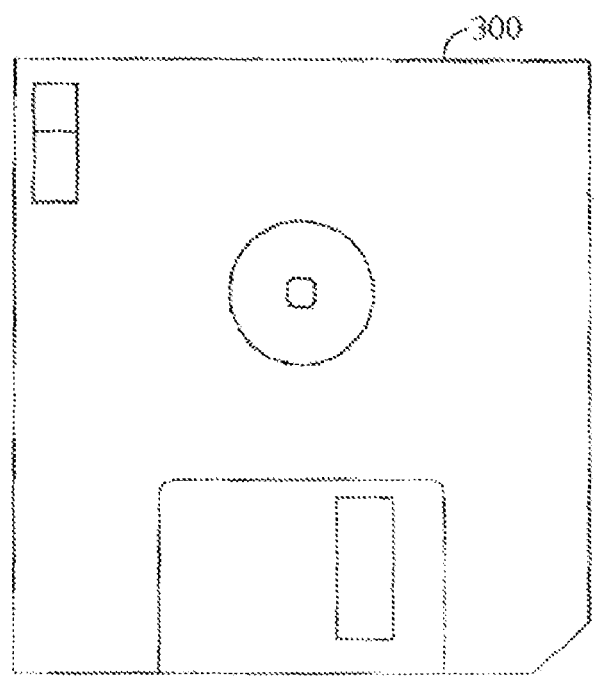
FIG. 3 is an exemplary signal bearing medium.
Figure 4:
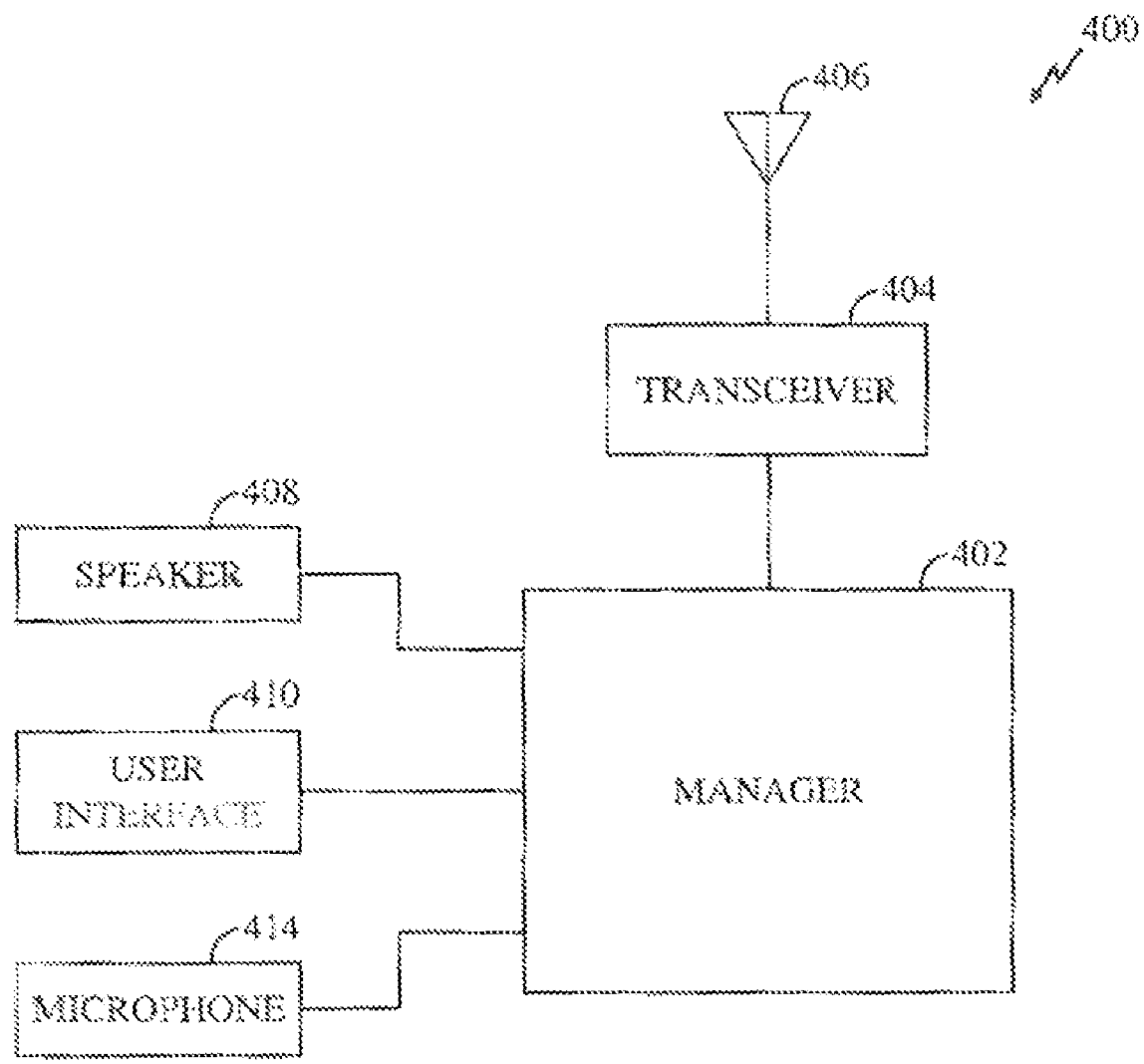
FIG. 4 is a block diagram of the hardware components and interconnections in a subscriber-station implemented as a wireless remote apparatus.

FIG. 4 further illustrates the construction of an exemplary subscriber-station 114 by depicting a wireless telephone 400. The telephone 400 includes a speaker 408, user interface 410, microphone 414, transceiver 404, antenna 406, manager 402, along with any other conventional circuitry that may vary depending upon the application. The manager 402, which may comprise circuitry such as that discussed above in conjunction with FIGS. 3-4, manages operation of the components 404, 408, 410, and 414 as well as signal routing between these components.

Although the wireless telephone 400 is illustrated, a subscriber-station may be mobile or stationary. Furthermore, a subscriber-station may comprise any data device that communicates through a wireless channel or through a wired channel, for example using fiber optic or coaxial cables. In addition to (or instead of) wireless and wireline phones, a subscriber-station may be configured to implement various other devices including but not limited to PC card, compact flash, external or internal modem, etc.

Operation

Having described various structural features, some operational aspects of the present disclosure are now described. As mentioned above, operation of the system 100 includes base stations 110 providing broadcast content services to subscriber-stations 114 over shared and/or individual channels. In response to one or more prescribed condition changes, there is a switch in the type of communications channel used to provide broadcast content of a given program to one or more subscriber-stations.

Signal-Bearing Media

Figure 2:
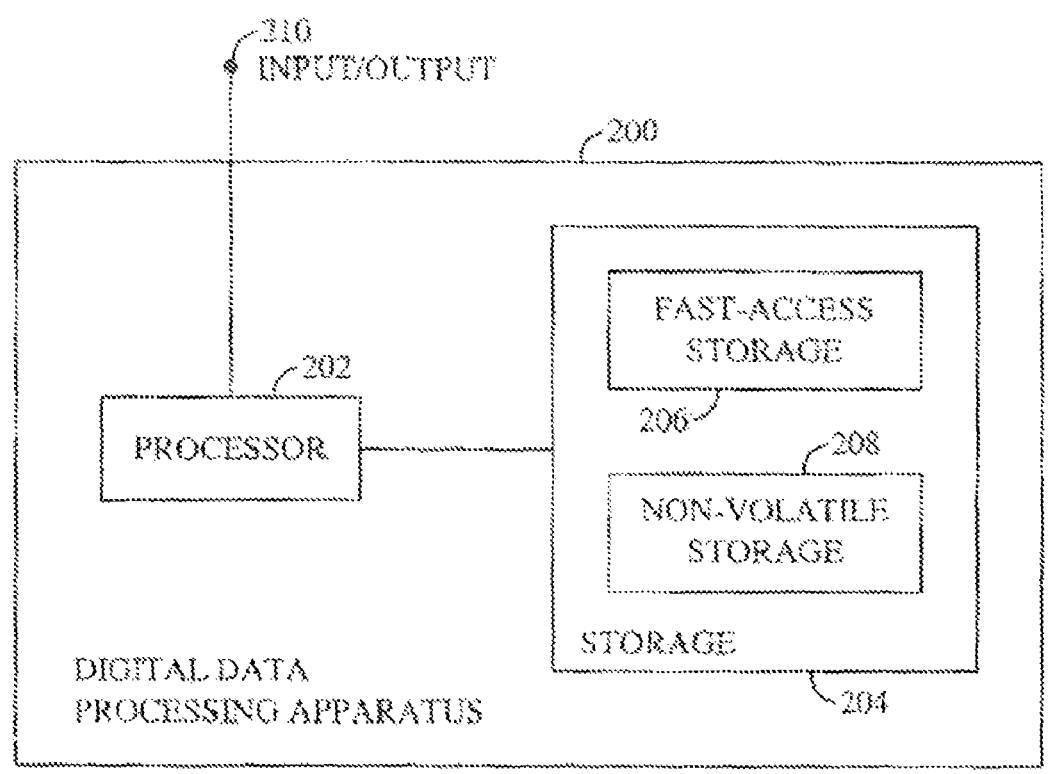
FIG. 2 is an exemplary digital data processing machine.

Wherever any functionality of the invention is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Introduction to Operational Details

As mentioned above, base stations 110 of the present disclosure each provide broadcast content services to subscriber-stations 114 over communication channels of the following types: 1) shared channels for use by multiple subscriber-stations, 2) individual channels each dedicated for use by an individual subscriber-station. In response to one or more prescribed condition changes, there is a switch in the type of communications channel used to provide a given program of broadcast content to one or more subscriber-stations.

Subscriber-Stations—Call Model

Figure 5A:
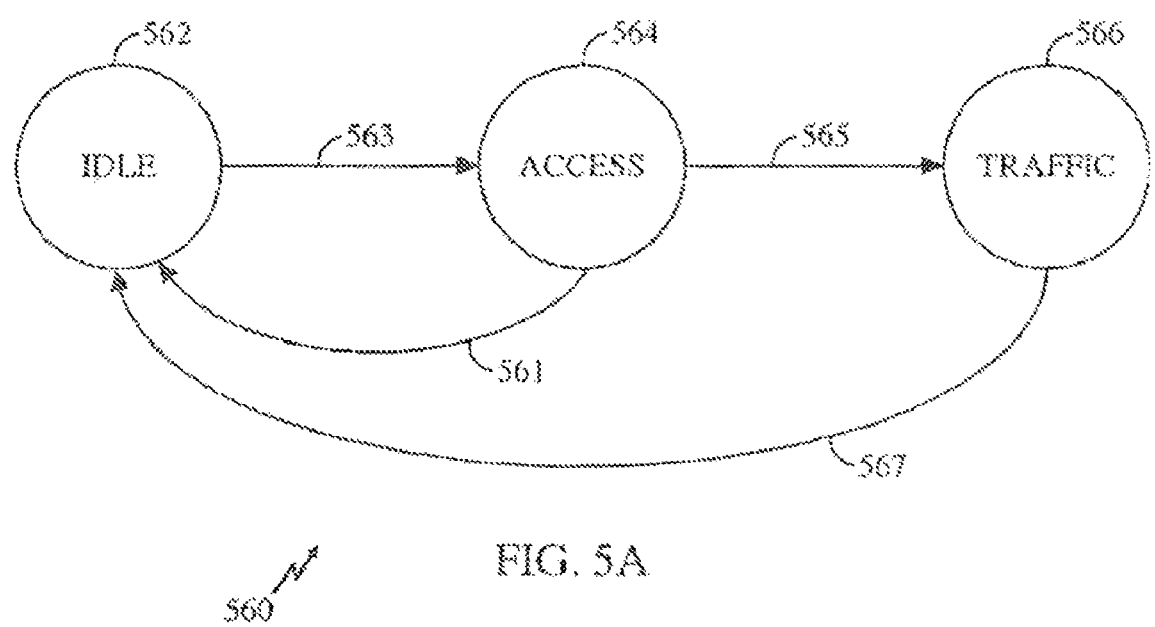
FIG. 5A is a state diagram illustrating the operational states of a subscriber-station.

Each subscriber-station operates according to the state diagram 560 of FIG. 5A. In the IDLE state 562, the subscriber-station monitors a shared paging channel and a shared overhead channel, described in greater detail below. These channels are shared in the sense that every base station broadcasts these channels to all subscriber-stations in range. Briefly, the shared paging channel advises subscriber-stations of incoming calls and the shared overhead channel supplies various system related information. In the IDLE state 562, the subscriber-station may additionally receive broadcast content from the base station via one or more shared broadcast channels. In the IDLE state 562, the subscriber-station's transmitter is turned off.

In one case, transition 563 from IDLE 562 to ACCESS 564 may occur when the subscriber-station sends a registration message, advising nearby base stations of the subscriber-station's location. In this case, the ACCESS state 564 transitions 561 back to IDLE 562 after the registration message.

In another situation, transition 563 from IDLE 562 to ACCESS 564 occurs during the establishment of a point-to-point call, either by the subscriber-station or another party. As one example, if another party initiates the call, the subscriber-station receives a paging message over the common paging channel. After the subscriber-station answers the page on a common "access" channel, the subscriber-station receives assignment of a traffic channel on which to conduct the point-to-point call. The subscriber-station initiates an outgoing call by sending an appropriate message on the access channel, and then receiving channel assignment in the same manner.

Transition 565 from ACCESS 564 to TRAFFIC 566 occurs when the incoming or outgoing call goes through, and the subscriber-station and base station begin to communicate on the traffic channel. In the TRAFFIC state 566, the subscriber-station utilizes an individual traffic channel to conduct point-to-point communications with another party. The newly initiated point-to-point call may conduct voice, data, or even broadcast information as discussed below. If the point-to-point call carries broadcast content, then it substitutes for any shared broadcast that the subscriber-station was previously receiving in the IDLE state 562.

Transition 567 from the TRAFFIC 566 back to IDLE 562 occurs when the point-to-point call is terminated by either party or when the connection is otherwise broken. Transition 567 includes release of the traffic channel used to conduct the point-to-point call. If this point-to-point call contained broadcast content, then the transition 567 may optionally result in resumption of broadcast content delivery via shared channel in the IDLE state 562.

Channels

Figure 5B:
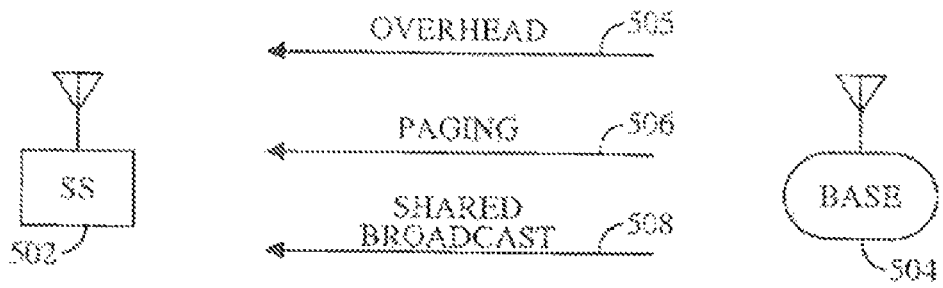
FIGS. 5B-5D are block diagrams illustrating different messages exchanged between subscriber-station and base stations during IDLE, ACCESS, and TRAFFIC states, respectively.
Figure 5C:
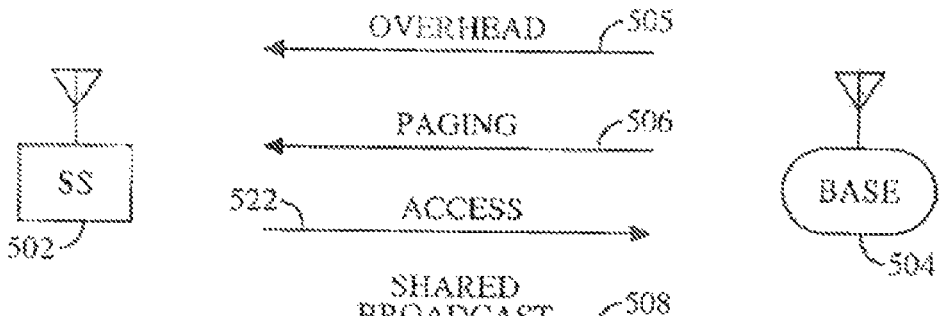
Figure 5D:
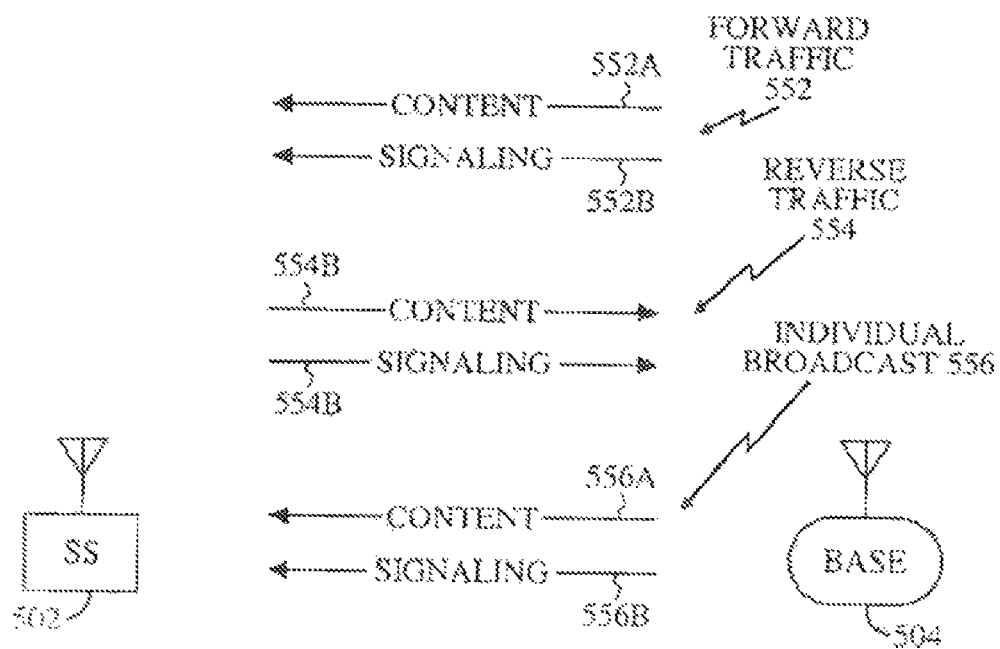

FIGS. 5B-5D describe some of the primary communications channels used to relay information between subscriber-station and base station during the IDLE, ACCESS, and TRAFFIC states discussed above. The broadcast channels of the present disclosure may be utilized to relay data, audio, video, or any other desired content.

"Communication channel/link" refers to a physical channel or a logical channel in accordance with the context. "Physical channel" means a communication route over which a signal propagates described in terms of modulation characteristics and coding. "Logical channel" means a communication route within the protocol layers of either the base station or the subscriber-station. "Reverse channel/link" means a communication channel/link through which the subscriber-station sends signals to the base station. "Forward channel/link" means a communication channel/link through which a base station sends signals to a subscriber-station.

IDLE State

FIG. 5B addresses the IDLE state. The base station 504 transmits the overhead channel 505 for receipt by the subscriber-station 502 as well as all other subscriber-stations being served by that base station. The overhead channel 505 contains periodically repeated system information, such as information about neighboring base stations, access information (e.g., recommended power levels, maximum message size, etc.), and system parameters (such as product revision levels, supported features, etc). In a CDMA-2000 system, the overhead channel 505 may comprise the broadcast control channel (F_BCCH).

As one example, contents of the overhead channel 505 may include a broadcast system parameters message (BSPM), which specifies each different broadcast program that is available over shared and/or individual channels. A "program" is a particular stream of broadcast content, such as CNN news, or ESPN, or weather information, etc. The broadcast system parameters message indicates which program is on each of the base station's shared channels (and the frequency or other channel identity), and which programs can be obtained on individual channels (with specific frequencies to be determined at the time of establishing service on the individual channel). The broadcast system parameters message lists specific attributes of each shared broadcast channel, such as Walsh code, modulation type, Viterbi coding, data rate, error correction, and the like.

The base station 504 also transmits a shared paging channel 506 for receipt by all subscriber-stations being served by that base station. All subscriber-stations served by the base station 504 monitor the paging channel 506 so that they can be alerted upon arrival of a point-to-point call or other information for them. In CDMA-2000, the paging channel 506 is exemplified by the forward control channel (F_CCCH).

The shared broadcast channel 508 encompasses potentially many shared broadcast sub-channels (parallel channels) transmitted by the base station 504 for use by subscriber-stations in-range of the base station. Broadly, the communication system 100 enables high-speed broadcast service by introducing a forward broadcast supplemental channel (F_B-SCH) capable of high data rates and suitable for receipt by a large number of subscriber-stations. The "forward broadcast supplemental channel" comprises a single forward link physical channel that carries broadcast traffic. One or more high-speed broadcast service channels are time-division-multiplexed within the single forward broadcast shared channel. Thus, the channel 508 may carry a number of different broadcast programs concurrently.

The shared broadcast channels 508 may be freely available to all subscriber-stations, or limited to subscriber-stations that have completed certain enrollment steps. Since the channel 508 is universally broadcast to all subscriber-stations within range, the subscriber-stations ultimately manage whether the user can access the broadcast or not based on whether the user has enrolled. As one example, each shared broadcast channel may be encrypted with a prescribed code, which is only provided to enrolled subscriber-stations.

A mechanism for enrollment to broadcast services is discussed in the following reference, the entirety of which is incorporated herein: U.S. patent application Ser. No. 09/934,021, filed on Aug. 20, 2002 and entitled "METHOD AND APPARATUS FOR OUT OF BAND TRANSMISSION OF BROADCAST SERVICE OPTION IN A WIRELESS COMMUNICATION SYSTEM." In the foregoing application, the shared broadcast channel 508 is referred to as the forward broadcast supplemental channel (F-BSCH).

ACCESS State

FIG. 5C addresses the ACCESS state. The subscriber-station 502 continues to receive the overhead 505, paging 506, and shared broadcast 508 channels. The shared access channel 522 is used by all subscriber-stations served by the base station 504. To begin a point-to-point call, the access channel 522 can be used in two ways. For incoming calls, the subscriber-station 502 uses the access channel 522 to answer a page when another station is initiating a point-to-point call to the subscriber-station 502. For outgoing calls, the subscriber-station 502 uses the access channel 522 to request initiation of a point-to-point call. In the CDMA-2000 protocol, the access channel 522 is exemplified by the reverse access channel (R_ACH). During the ACCESS state 564, the subscriber-station 502 may continue to monitor the shared broadcast 508.

Apart from point-to-point call initiation, the subscriber-station 502 may use the access channel 522 to occasionally transmit a registration message. This serves to advise the wireless network of the subscriber-station 502's location, along with any other relevant information. In the event of registration or other similar messages occurring in the ACCESS state 564, the subscriber-station 502 returns to IDLE 562 without entering the TRAFFIC state 566.

TRAFFIC State

FIG. 5D addresses the TRAFFIC state 566. In this state, the traffic channels 552, 554 cooperatively conduct two-way point-to-point call data between the subscriber-station 502 and base 504. The channels 552, 554 are dedicated channels for individual use of the subscriber-station 502. The forward traffic channel 552, a "logical" channel, includes parallel physical channels such as the traffic-content channel 552a and the traffic-signaling channel 552b. The traffic-content channel 552a carries content, such as the voice information or data conveyed from the base 504 to the subscriber-station 502. The traffic-signaling channel 552b carries signaling information such as housekeeping, metadata, system information, and other information that describes the channel 552a and/or its content. In an alternative embodiment, the channels 552a, 552b may be unrelated, rather than being parallel channels as described. The reverse traffic channel 554 also includes parallel traffic-content and signaling channels 554a, 554b, conducting communications in the opposite direction of the channel 552.

In the TRAFFIC state, the subscriber-station does not use the access channel 522, overhead 505, or paging channels 506, since this information is conveyed on the dedicated signaling channels 552b, 554b instead.

During TRAFFIC 566, the subscriber-station 502 may continue to receive broadcast content. However, delivery of broadcast content concurrently with a point-to-point call 552/554 is necessarily conducted on a one-way point-to-point channel 556 rather than the shared channel 508. This is chiefly because the signaling and control procedures that are required for proper operation of mobile station are vastly different in IDLE versus TRAFFIC channels, and hence the mobile station can only be in one of these two states at any given time. Therefore, while traffic channels 552, 554 are in use, the exchange of any broadcast information during this time necessarily occurs on a traffic channel 556, with content occurring on 556a and signaling on 556b.

Generally, any forward link channel suitable for point-to-point calls may be used for the individual broadcast channel 556. Several more specific options are presented as follows. One option, using CDMA-2000 as an example, is the forward fundamental channel (F_FCH) or forward dedicated control channel (F_DCCH). This channel provides 14.4 kb/s. Another option is the forward supplemental channel (F_SCH), which provides up to 1 Mb/s. A still faster option is the forward packet data channel (F_PDCH), which provides still faster service up to 2.4 Mb/s.

Unlike the IDLE 562 and ACCESS 564 states, where the subscriber-station 502 only communicates with a single base station, the subscriber-station 502 in TRAFFIC may concurrently exchange traffic and broadcast content and signaling information with multiple base stations in order to effect a soft handoff, to obtain signal redundancy, or to achieve other goals. Therefore, ordinarily skilled artisans (having the benefit of this disclosure) will recognize that the present disclosure's references to "base station" (in the singular) are made for brevity and ease of discussion. Subscriber-stations may communicate with multiple base stations concurrently.

In addition, techniques are known for the subscriber-station 502 to conduct multiple two-way telephone conversations simultaneously on traffic channels 552, 554. These techniques involve, for example, time multiplexing different data streams so that a given channel can carry more than one. Utilizing similar technology, the present disclosure contemplates the subscriber-station 502 receiving multiple, concurrent broadcast programs on the individual channel 556.

Further Information

The physical and logical channels used in high speed broadcast services are discussed in greater detail in the following references, the entireties of which are incorporated herein by reference: (1) CDMA 2000 Physical Layer Standard, known as IS_2000.2, (2) U.S. patent application Ser. No. 09/933,978, filed Aug. 20, 2001 and entitled "METHOD AND APPARATUS FOR SIGNALING IN BROADCAST COMMUNICATION SYSTEM." The use of common and dedicated channels for information broadcast is disclosed in the following reference, the entirety of which is incorporated herein by reference: U.S. Patent Application No. 60/279,970, filed Mar. 28, 2001 and entitled "METHOD AND APPARATUS FOR GROUP CALLS USING DEDICATED AND COMMON CHANNELS IN WIRELESS NETWORKS."

Overview—Switching Between Shared/Individual Broadcast Channels

Figure 6:
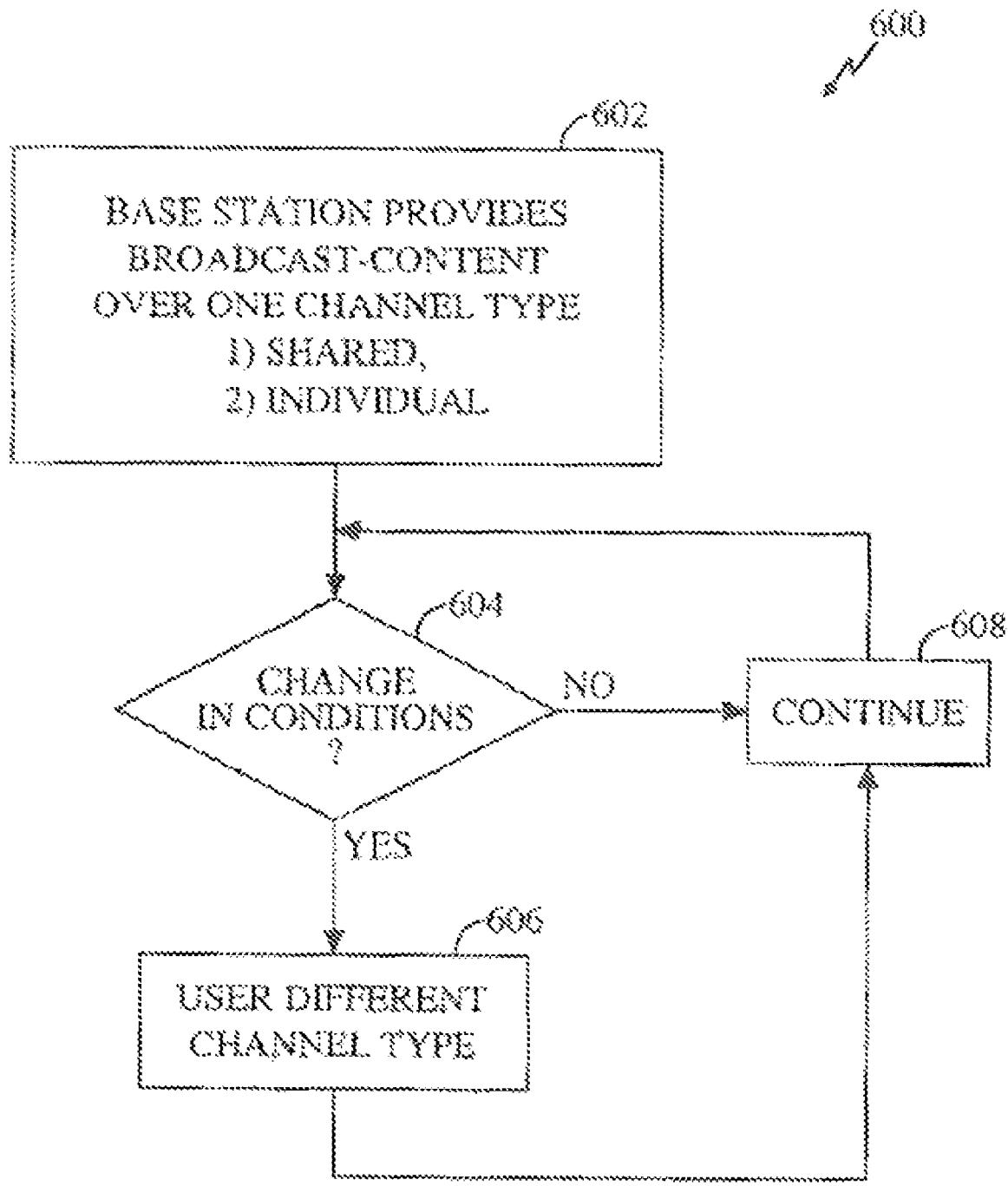
FIG. 6 is a flowchart showing the operation of a wireless communications network related to switching between shared and individual channels to provide broadcast content.

FIG. 6 describes the aspect of operation of the system 100 where, in response to one or more prescribed condition changes, there is a switch in the type of communications channel used to provide a given broadcast program to one or more subscriber-stations. Illustration of the sequence 600 in conjunction with the system 100, however, is merely exemplary as these principles may also be applied to systems of varying structure. The sequence is described in the context of one exemplary base station (the "subject" base station).

In step 602, the base station provides broadcast content to its subscriber-stations using shared and/or individual channels. Broadcast content includes one or more broadcast programs. Each subscriber-station receives one broadcast program singly, or multiple broadcast programs concurrently. From the base station, each program is transmitted on one shared channel or as many individual channels as the number of requesting subscriber-stations. As described below, the base station can change between shared/individual channels for delivery of each broadcast program, depending upon the availability of network resources and other factors discussed below.

Step 604 asks whether there has been a change in "conditions" (defined below) for a particular broadcast program that warrants switching from shared to individual broadcast channel, or vice versa. If there is no change, step 608 continues providing broadcast content in the same manner, and returns to the inquiry of step 604 later. If there is a change in "conditions," however, step 606 begins to utilize a different broadcast channel type, for example starting to use a shared channel if an individual channel had been used, or vice versa.

Figure 16:
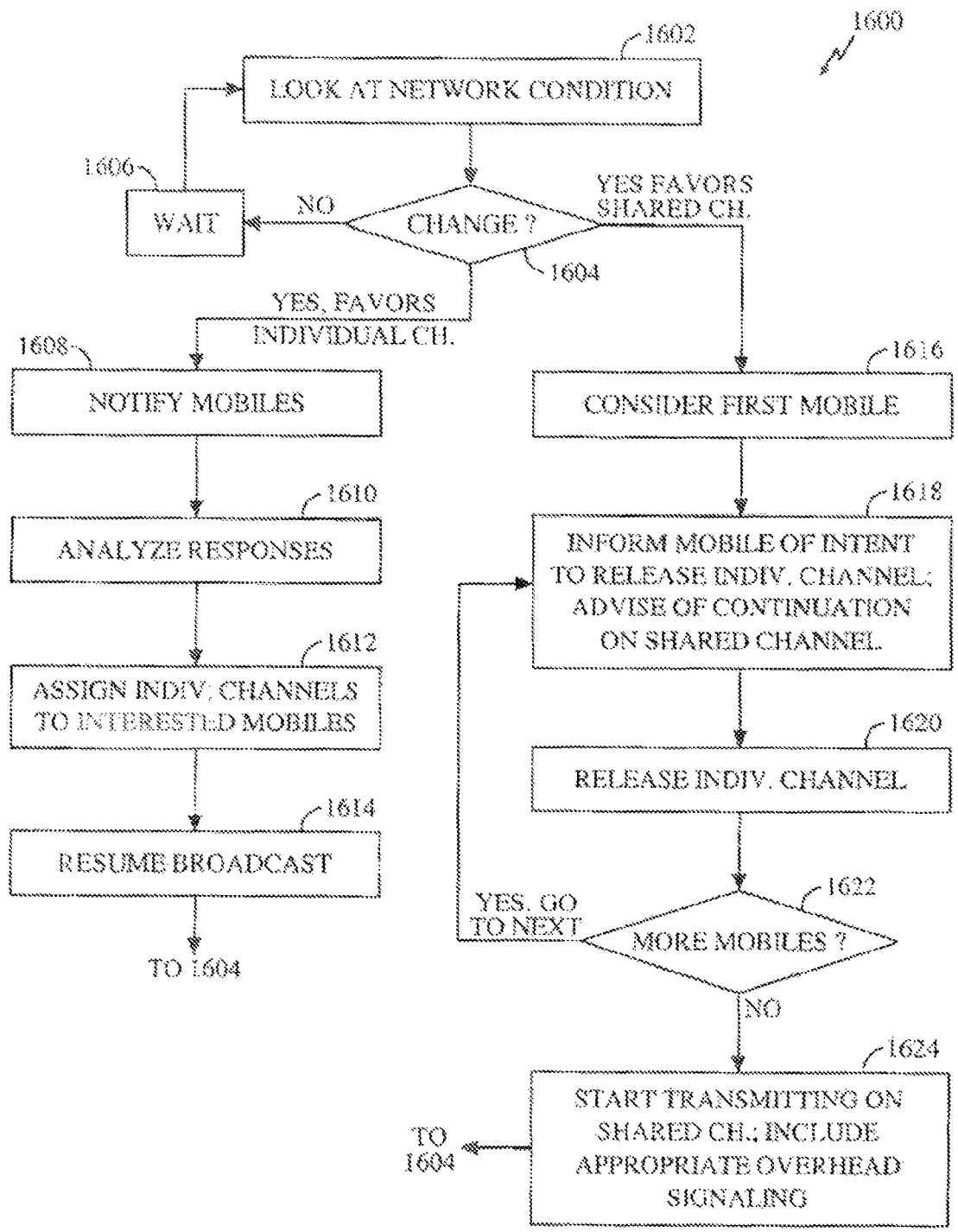
FIG. 16 is a flowchart showing operations of a base station examining network conditions and implementing any necessary changes in broadcast channel type.

Referring to step 604 in greater detail, this step encompasses a variety of different situations. In one example of step 604, the subject base station experiences a change in the number of subscriber-stations demanding a particular broadcast program from that base station, a change in the level of transmit power utilized by that base station, or a change in another network condition. For instance, if the base station is providing a particular broadcast program on individual channels, step 604 may be satisfied if the number of subscriber-stations demanding broadcast services rises above a prescribed threshold. Thus, switching to use of a shared communications channel (in step 606) may save power. FIGS. 16 (base station) and 18 (subscriber-station) illustrate this situation in greater detail, as discussed below. The opposite situation is also true, namely, where step 604 finds that the number of subscriber-stations demanding the particular broadcast program falls below the prescribed threshold, dictating use of individual broadcast channels in step 606. FIGS. 16 (base station) and 17 (subscriber-station) illustrate this situation in greater detail, as discussed below.

In another example of step 604, explained in conjunction with a subscriber-station, that subscriber-station experiences a change in broadcast channel type as it moves from coverage of one base station to another. One example is when a subscriber-station receiving a broadcast program over a shared channel transitions to another base station that is using individual channels to deliver that broadcast program. In this case, the subscriber-station switches (step 606) from shared to individual broadcast channel. This situation is discussed in greater detail in FIGS. 8A-8D (base station operations) and FIGS. 10-11 (subscriber-station operations). Similarly, a subscriber-station receiving a broadcast program over an individual channel might move into the area of another base station that is using a shared channel to deliver that broadcast program. In this case, the subscriber-station switches (step 606) from individual to shared broadcast channel. This situation is discussed in greater detail in FIGS. 9A-9D (base station operations) and FIGS. 12-13 (subscriber-station operations).

In still another example of step 604, the change in channel type may result from the subscriber-station receiving (or initiating) a point-to-point call while that subscriber-station is already receiving a broadcast program on a shared channel. As shown below, this requires changing broadcast content delivery to an individual channel (in step 608) during the point-to-point call. The details of this situation are discussed below in conjunction with FIGS. 14 (subscriber-station) and 15 (base station).

Change in Broadcast Channel Type Due to Subscriber-Station Transitioning from One Base Station to Another Introduction As mentioned above, various condition changes can cause a subscriber-station to change from shared to individual broadcast channels, or vice versa (step 606, FIG. 6). One such condition occurs when the subscriber-station transitions from a base station that is using one broadcast channel type to a base station using the other type.

Figure 7A:
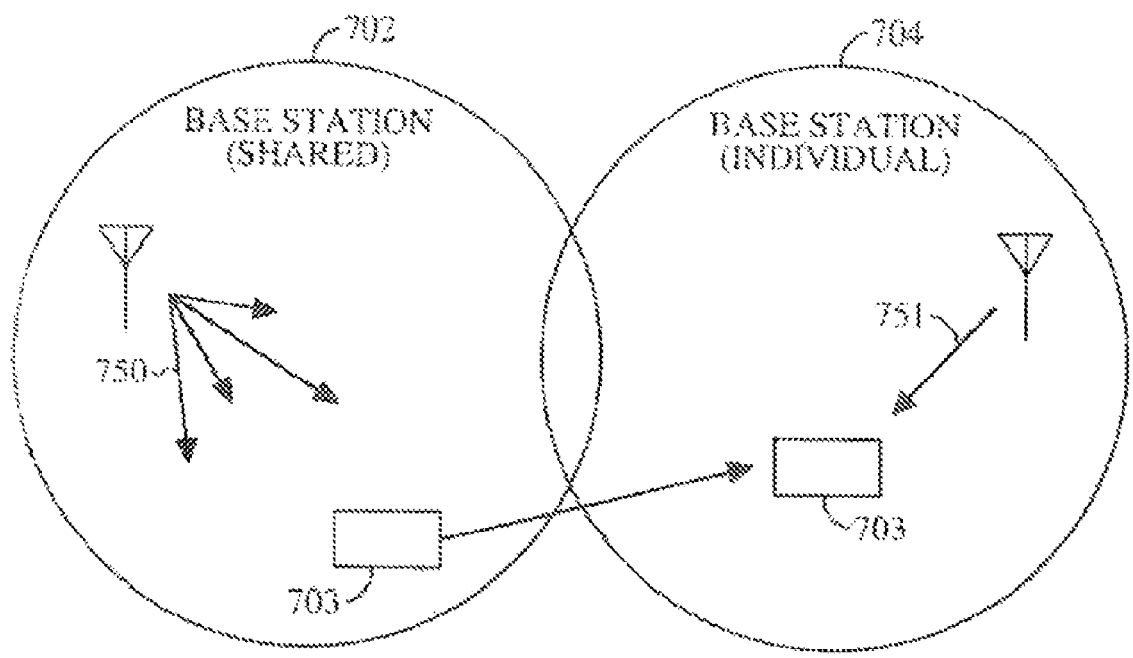
FIG. 7A is a diagram illustrating the transition of a subscriber-station from a base station using shared broadcast content delivery to a base station using individual broadcast content delivery.

FIG. 7A illustrates the situation where a subscriber-station 703 transitions from coverage of a base station 702 to a base station 704. With the base station 702, the subscriber-station 703 is receiving a particular broadcast program on a shared channel 750. With the new station 704, however, the subscriber-station 703 begins receiving the broadcast program on an individual broadcast channel 751. There may be various reasons for the necessity of using an individual broadcast channel in the base station 704. For example, the base station 704 may not be programmed to deliver shared broadcast content. In another example, with a small number of subscriber-stations requesting this particular broadcast program, the base station 704 may be conserving power by using relatively low power individual broadcasts rather than a shared broadcast.

Figure 7B:
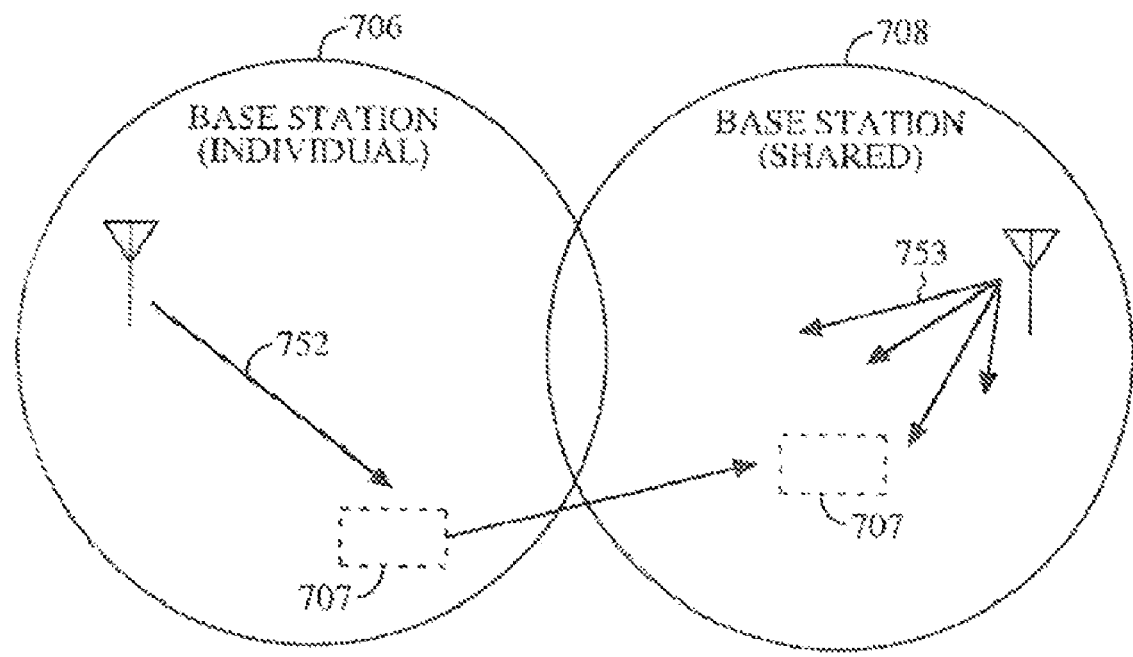
FIG. 7B is a diagram illustrating the transition of a subscriber-station from a base station using individual broadcast content delivery to a base station using shared broadcast content delivery.

FIG. 7B illustrates the situation where a subscriber-station 707 transitions from coverage between base stations 706, 708. With the base station 706, the subscriber-station 707 is receiving a particular program on an individual channel 752. With the new station 708, however, the subscriber-station 707 begins receiving the broadcast program on a shared broadcast channel 753. There may be various reasons for using a shared broadcast with base station 708, instead of continuing with an individual channel. For example, the base station 708 may not be programmed to deliver broadcast content on individual channels. In another example, where the base station 708 has a large number of subscriber-stations requesting this particular broadcast program, the base station 708 may conserve power by using one shared broadcast channel rather than many individual broadcast channels.

BASE STATION OPERATIONS, SHARED-TO-INDIVIDUAL TRANSITION, $1^{ST}$ EXAMPLE

Figure 8A:
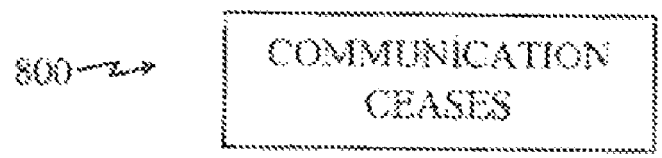
FIGS. 8A-8D are flowcharts describing base station operations for transition of a subscriber-station from a first base station (transmitting a broadcast program on a shared channel) to a second base station (transmitting the same program using individual broadcast channels).
Figure 8B:
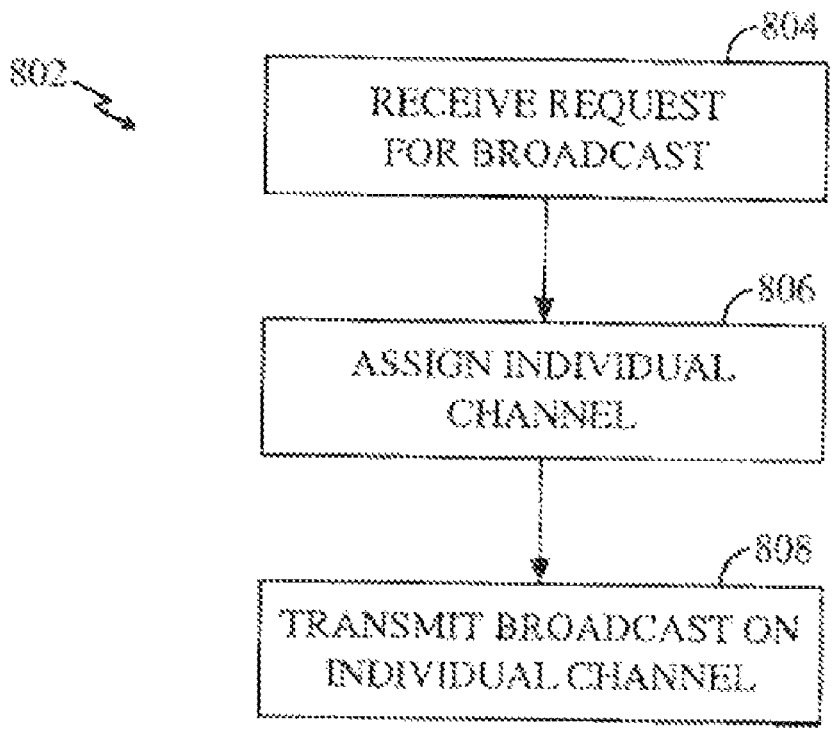

FIGS. 8A-8B show how base stations deliver a broadcast program to a subscriber-station transitioning from a first base station (where that program is transmitted on a shared broadcast channel) to a second base station (where that program is available on individual channels). Without any intended limitation, FIGS. 8A-8B are illustrated in the context of base stations 702, 704 from FIGS. 7A-7B and various channels from FIGS. 5B-5D. As mentioned above, the base station 702 is initially transmitting a broadcast program to the subscriber-station 703 over a shared communications channel 750. The base station 704 has already elected to utilize individual broadcast channels to deliver this program.

Briefly, in this embodiment, the first base station 702 does not aid in handing off the subscriber-station 703. Rather, the base station 702 lets the subscriber-station establish service anew with the base station 704.

FIG. 8A describes the operations 800 of the first base station 702. Namely, when the subscriber-station 703 leaves the area 702, the base station 702's communications with the subscriber-station 703 simply cease (step 800). This is because the base station 702 is presumably making the shared broadcast 750 for a number of different subscriber-stations, and the departure of subscriber-station 703 from the coverage area does not change anything.

FIG. 8B describes the operations 802 of the second base station 704. In step 804, the base station 704 receives the subscriber-station's request to continue receiving the same broadcast content. This request is received over the access channel 522 (FIG. 5C), for example. In one case, the base station 704 might have already elected to use individual channels to deliver this particular broadcast program, due to programming of the base station 704, lack of user interest failing to justify use of a shared channel, or another reason. In another case, the base station 704 might not be delivering this broadcast content at all. In either case, the use of a shared broadcast is not appropriate. Therefore, base station 704 responds to the subscriber-station's request 804 by assigning an individual broadcast channel 751 to the subscriber-station 703 in step 806. Assignment is made, for example, over the paging channel 506 (FIG. 5B) and specifies the individual channel 751 (556 of FIG. 5C). Next, in step 808, the base station 704 begins to transmit the broadcast content over the assigned individual channel 751 (556 of FIG. 5D) in a point-to-point call with the subscriber-station 703.

BASE STATION OPERATIONS, SHARED-TO-INDIVIDUAL TRANSITION, $2^{nd}$ EXAMPLE

Figure 8C:
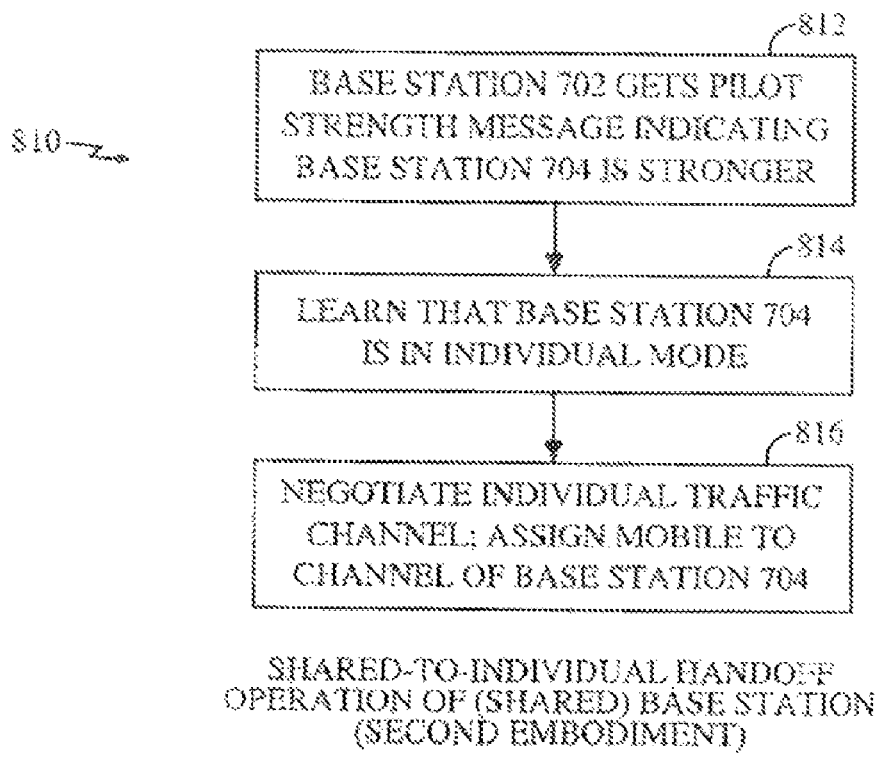
Figure 8D:
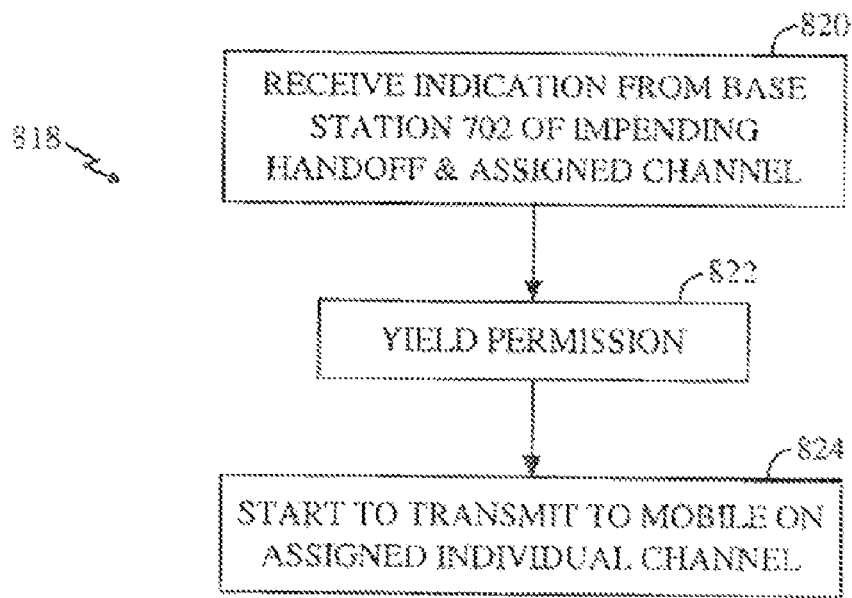

FIGS. 8C-8D show alternative sequences 810, 818 to the sequences 800, 802 of FIGS. 8A-8B. In this embodiment, the base station 702 assists the subscriber-station 703 in handing off to the base station 704. As mentioned above, the base station 702 is initially transmitting a particular broadcast program to the subscriber-station 703 over a shared communications channel 750. The base station 704 has already elected to utilize individual broadcast channels to deliver this program, or it may not be delivering this broadcast content yet.

FIG. 8C shows the operations of the first base station 702. In step 812, the base station 702 receives a pilot strength report message indicating that the subscriber-station 703 is receiving stronger signals from base station 704. This pilot strength report message is transmitted by the subscriber-station 703 over the access channel 522 (FIG. 5C), for example, and may constitute part of a registration message or a specialized pilot strength measurement message. In step 814, the base station 702 learns that the base station 704 is transmitting the subject broadcast program on individual, point-to-point channels rather than a shared channel. This is accomplished by wireline communications (not shown) between the base stations. In CDMA-2000, for example, these communications may occur over network-side interfaces such as the A3/A7 interface between base stations. After step 814, the base station 702 negotiates with the base station 704 for an individual traffic channel 751, so that the base station 704 can continue providing the broadcast content on this channel. Communication between base stations, as mentioned above, may occur on a wireline connection such as a network-side interface. Also, the base station 702 assigns the subscriber-station 703 to the negotiated channel 751 by sending a channel assignment message to the subscriber-station 703 on the paging channel 506 (FIG. 5C). After step 816, the handoff routine 810 ends.

FIG. 8D shows the operations 818 of the second base station 704. In step 820, the base station 704 receives notification from base station 702 of the impending handoff of the subscriber-station 703 and the proposed assigned channel 751. This information was transmitted to the second base station 704 by the first base station 702 in step 816 (FIG. 8C). In response, the base station 704 yields permission (step 822) to the first base station, and then starts to transmit (step 824) the subject broadcast program to the subscriber-station 703 using a point-to-point connection upon the assigned individual channel 751, also shown as channel 556 in FIG. 5D. After step 824, the handoff routine 818 ends.

BASE STATION OPERATIONS,
INDIVIDUAL-TO-SHARED TRANSITION, $1^{ST}$
EXAMPLE

Figure 9A:
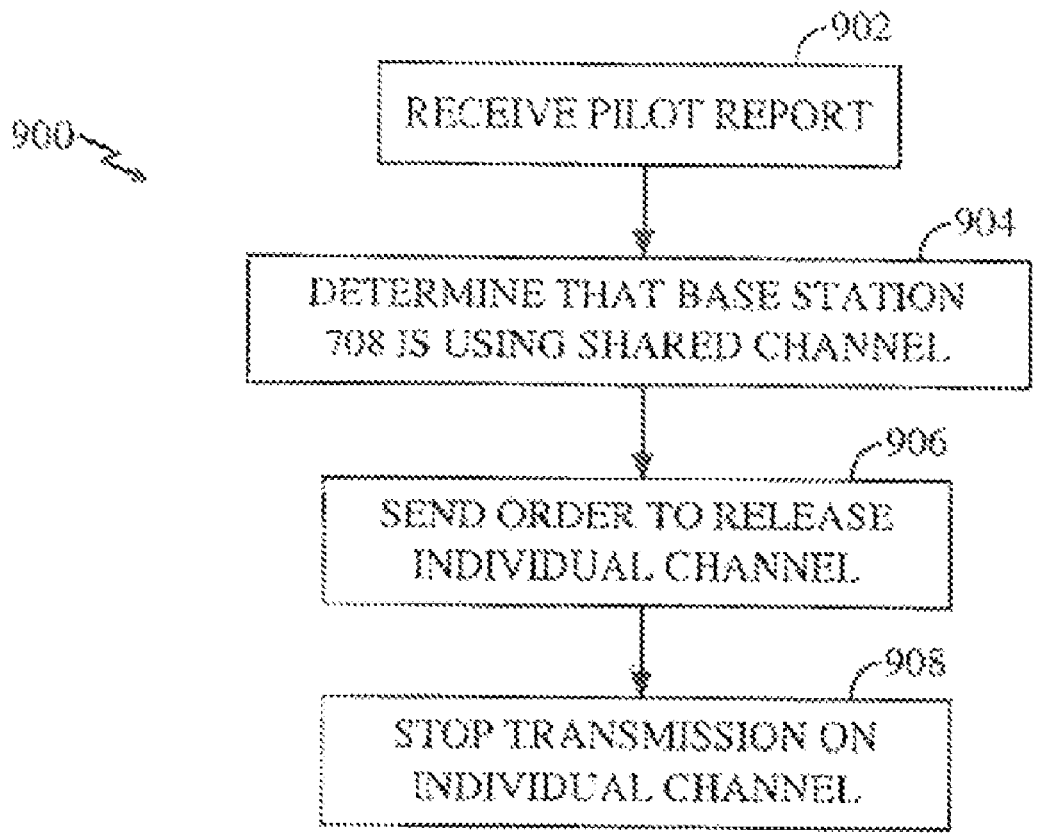
FIGS. 9A-9D are flowcharts describing base station operations for transition of a subscriber-station from a first base station (transmitting a broadcast program on an individual channel) to a second base station (transmitting the same program on a shared broadcast channel).
Figure 9B:
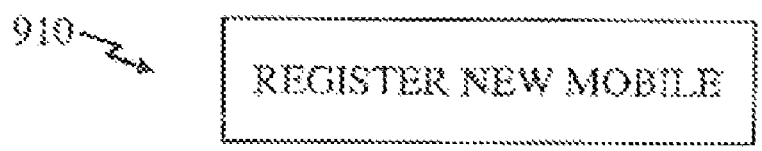

FIGS. 9A-9B show how base stations deliver a particular broadcast program to a subscriber-station during transition from a first base station (delivering this program over individual channels) to a second base station (delivering this program over a shared channel). Without any intended limitation, FIGS. 9A-9B are illustrated in the context of base stations 702, 704 from FIGS. 7A-7B and various channels from FIGS. 5B-5D. As mentioned above, the base station 706 is initially transmitting the subject broadcast program to the subscriber-station 707 over an individual communications channel 752. The base station 708 is already delivering this broadcast program using a shared communications channel 753.

Briefly, in this embodiment, the first base station 706 determines that the second base station 708 is using a shared broadcast channel to deliver the program that the subscriber-station 707 is currently receiving, so the base station 706 simply releases the subscriber-station 707 without any handoff.

FIG. 9A describes the operations 900 of the base station 706. Namely, in step 902, the base station 706 first receives a pilot strength report message from the subscriber-station 707. As known in the art, subscriber-stations occasionally transmit pilot strength report messages indicating the relative strengths of pilot signals received by nearby base stations, to assist base stations with smooth handoffs. In step 904, the base station 706 recognizes that the subscriber-station is transitioning to the base station 708, and also determines that this station 708 is using a shared broadcast channel 753 to deliver the subject program. As mentioned above, inter-base station communications may be conducted over network-side interfaces or other wireline connection between base stations.

Next, the station 706 transmits (step 906) an order for the subscriber-station 707 to release the individual broadcast channel 752 (channel 556, FIG. 5D), and then the station 706 stops transmitting (step 908) the broadcast content on this channel 752. The release order is sent on the dedicated signaling channel (556b, FIG. 5D). This ends the sequence 900.

FIG. 9B shows the operations 910 of the second base station 708 in connection with FIG. 9A. As mentioned above, the sequences 900, 910 are conducted without any handoff, since the first station 706 merely releases the subscriber-station 707 and stops transmitting on the channel 752. Accordingly, in step 910, the second base station 708 registers the subscriber-station 707 upon receiving a registration message therefrom. The sequence 910 does not include any special operations related to broadcast delivery, because the station 708 is already providing a shared broadcast 753 of the desired program. However, as for the subscriber-station operations (described below), after registration 910 the subscriber-station may monitor the appropriate shared broadcast channel 753 to begin receiving the same broadcast program that was being received from the station 706.

BASE STATION OPERATIONS,
INDIVIDUAL-TO-SHARED TRANSITION, $2^{nd}$
EXAMPLE

Figure 9C:
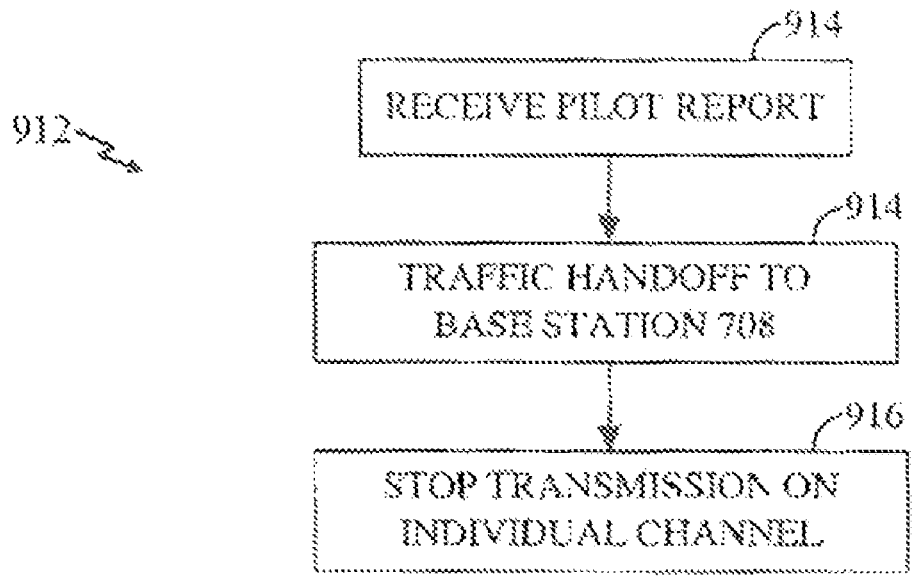
Figure 9D:
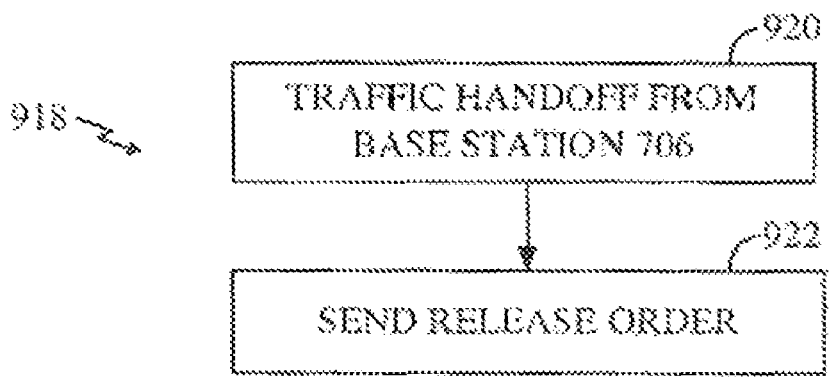

FIGS. 9C-9D show alternative sequences 912, 918 to the sequences 900, 910 of FIGS. 9A-9B. As mentioned above, the base station 706 is initially transmitting a broadcast program to the subscriber-station 707 over an individual broadcast channel 752. The base station 708 has previously elected to utilize a shared broadcast channel 753 to deliver this program; this may be for reasons of administration, efficiency, network conditions, hardware and/or software limitations, or any other reason. Briefly, in this embodiment, the base station 706 assists the subscriber-station 707 in a handoff to the base station 708, and then the base station 706 proceeds to release the subscriber-station 707.

FIG. 9C describes the operations 912 of the base station 706. Namely, in step 914, the base station first receives a pilot strength report message from the subscriber-station 707. In step 914, the base station 706 identifies the base station 708 for handoff and performs a traffic handoff to the base station 708. Procedures for conducting a traffic handoff of a point-to-point call are well known in the art. With this traffic handoff, any traffic connection 552, 554 (such as a voice call) is fully handed off to the receiving base station 708. Only certain aspects of the broadcast connection 556, however, are continued from base stations 706 to 708. Namely, broadcast signaling 556b is continued, but broadcast content 556a is not; this is because the base station 708 (as mentioned above)

has elected not to transmit the broadcast program on individual channels. Therefore, the base station 706 terminates the transmission of broadcast content on the individual channel 556a (step 916). In particular, the base station 706 ceases transmissions on the individual channel 752 previously used to deliver the broadcast program to the subscriber-station 707. This ends the sequence 912.

FIG. 9D shows the operations 918 of the second base station 708 in connection with FIG. 9C. In step 920, the base station 708 participates in the traffic handoff of subscriber-station 707 from the base station 706. Namely, the base station 708 takes over any traffic connection 552/554 and the signaling channel 556b. Then, in step 922, the base station 708 sends a release order to terminate the remnant of the connection 752, that is, the channel 556b. The sequence 918 does not include any special operations related to broadcast delivery, because the station 708 is already providing a shared broadcast 753 of the relevant content. However, as for the subscriber-station operations (described below), the subscriber-station can start to monitor the appropriate shared broadcast channel 753 at any time to continue receiving the same broadcast content that was being received from the station 706.

SUBSCRIBER-STATION OPERATIONS,
SHARED-TO-INDIVIDUAL TRANSITION, $1^{ST}$
EXAMPLE

Figure 10:
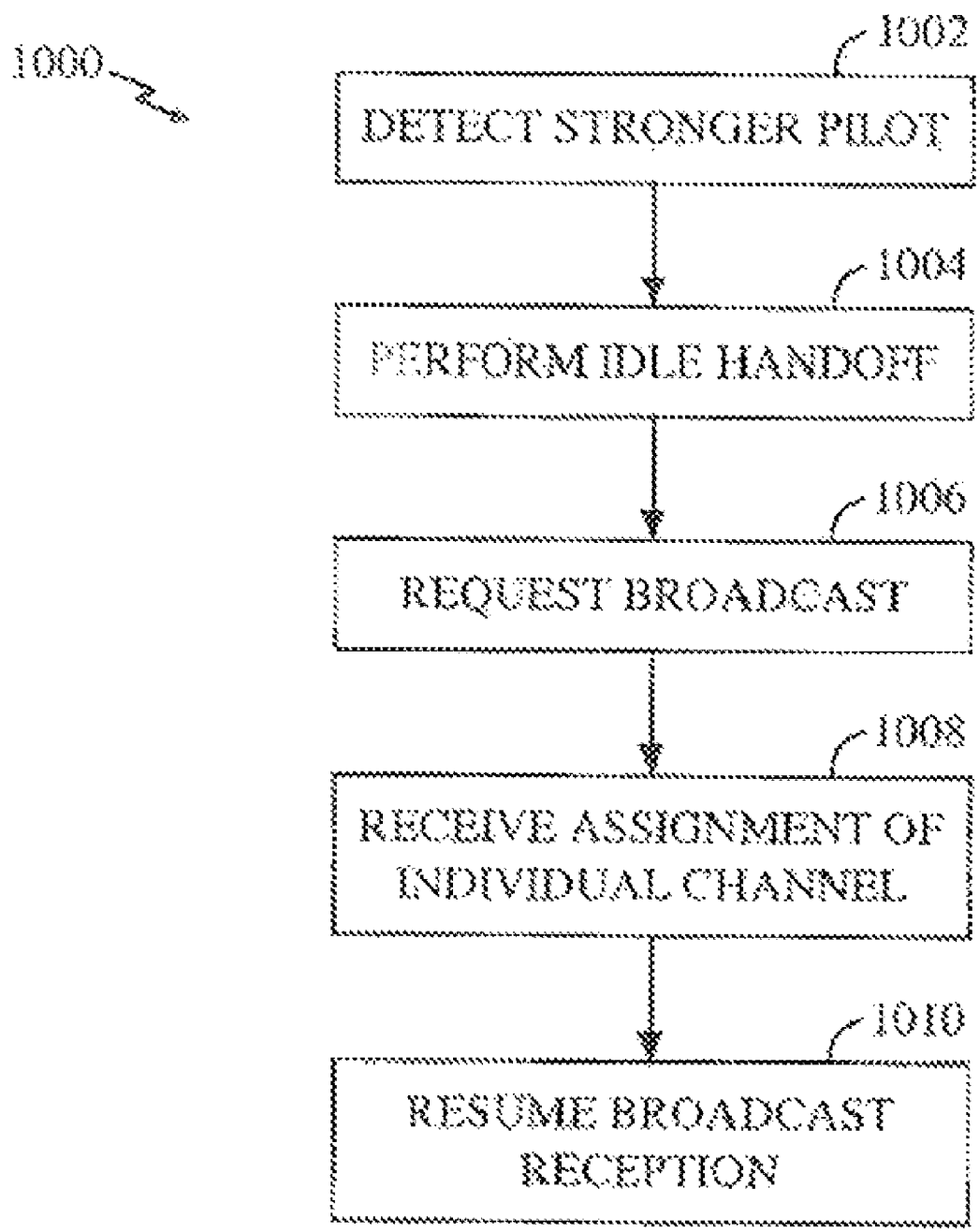
FIGS. 10-11 are flowcharts describing subscriber-station operations involved in transitioning from a first base station (transmitting a broadcast program on a shared broadcast channel) to a second base station (transmitting the program on individual broadcast channels).

FIG. 10 shows the operations 1000 performed by a subscriber-station in transferring from shared delivery of a broadcast program by one base station, to individual delivery of the broadcast program by another base station. Without any intended limitation, FIG. 10 is illustrated in the context of base stations 702, 704 from FIG. 7A and various channels from FIGS. 5B-5D. As mentioned above, the subject subscriber-station 703 is initially receiving a broadcast program upon the shared communications channel 750. As for the base station 704, this station has already elected to utilize individual broadcast channels to deliver this program, or may not be delivering this broadcast program yet.

As mentioned above, the first base station 702 does not aid in handing off the subscriber-station 703 in this embodiment. Rather, the base station 702 lets the subscriber-station establish broadcast service anew with the base station 704. The operation of the subscriber-station 703 in this embodiment, depicted by sequence 1000 of FIG. 10, corresponds to the base station operations described by FIGS. 8A-8B.

In step 1002, the subscriber-station 703 self-evaluates the pilot signals (not shown) from the base stations 702, 704. Recognizing that the pilot signal from the base station 704 is stronger than that from 702, the subscriber-station 703 engages in an idle handoff to the base station 704 (step 1004). This involves terminating reception of the shared broadcast 750 and registering with the base station 704. As mentioned above, registration is conducted over the access channel (522, FIG. 5B) and serves to advise the new base station 704 of the subscriber-station 703's presence therein.

In step 1006, the subscriber-station 703 sends a request to the base station 704, seeking receipt of the broadcast program that the subscriber-station was receiving with the previous base station 702. Next, the subscriber-station 703 receives assignment of an individual channel 751 (556, FIG. 5D) containing the desired broadcast program (step 1008). In step 1010, the subscriber-station 703 begins to receive the desired broadcast program on the individual channel 751/556. This ends the sequence 1000.

SUBSCRIBER-STATION OPERATIONS,
SHARED-TO-INDIVIDUAL TRANSITION, $2^{nd}$
EXAMPLE

Figure 11:
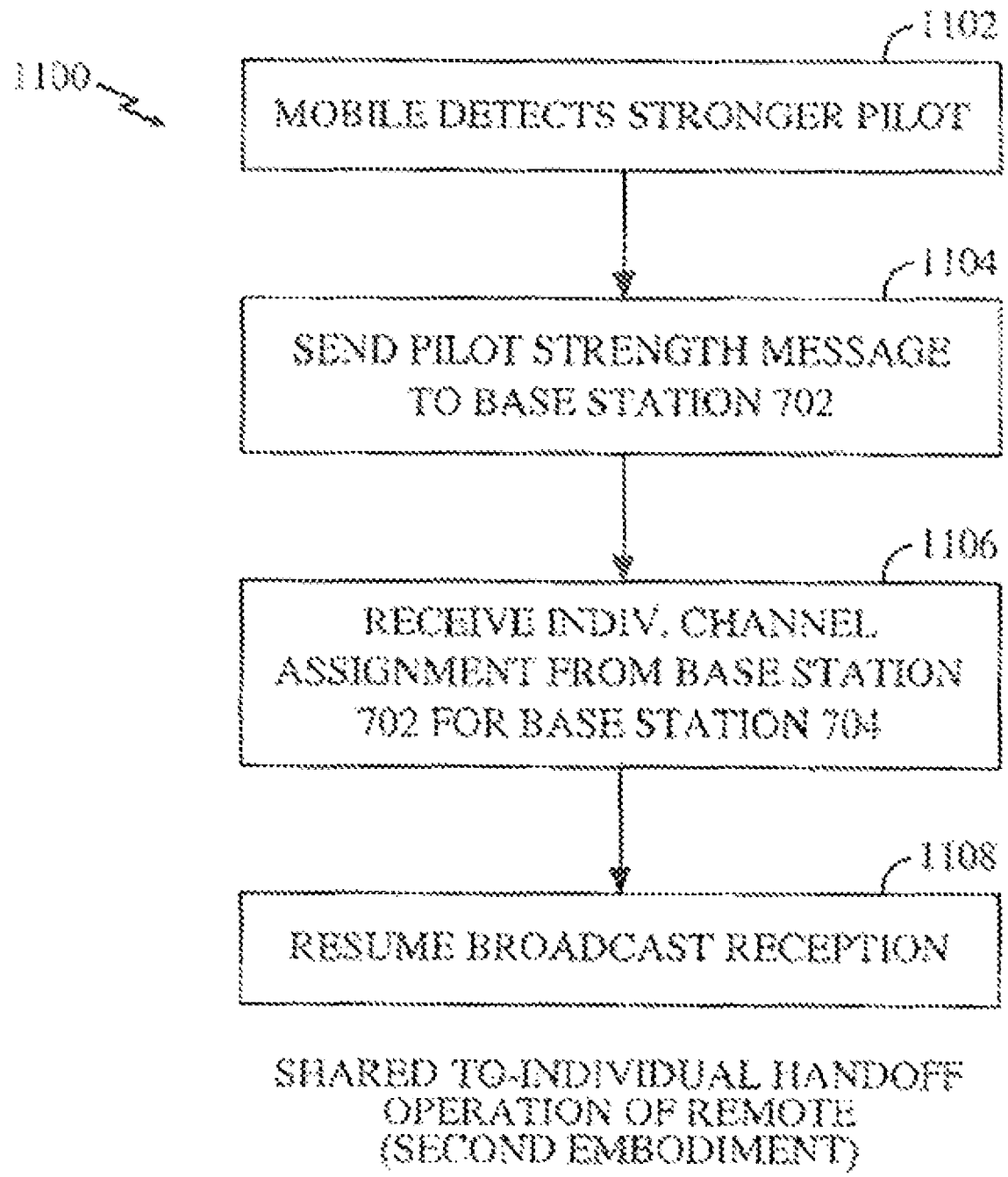

FIG. 11 shows a different example of operations 1100 performed by a subscriber-station in order to transfer from shared delivery of a broadcast program by one base station, to individual delivery of the broadcast program by another base station. Without any intended limitation, FIG. 11 is illustrated in the context of base stations 702, 704 from FIG. 7A and various channels from FIGS. 5B-5D. As mentioned above, the subscriber-station is initially receiving the subject broadcast program upon the shared communications channel 750. As for the base station 704, this station has already elected to utilize individual broadcast channels to deliver this program, or may not be delivering this broadcast program yet at all.

Briefly, in this embodiment, the first base station 702 aids in handing the subscriber-station 703 over to the base station 704. The operation of the subscriber-station 703 in this embodiment, depicted by operations 1100 of FIG. 11, corresponds to the base station operations described by FIGS. 8C-8D.

In step 1102, the subscriber-station 703 self-evaluates the pilot signals (not shown) from the base stations 702, 704. Recognizing that the pilot signal from the base station 704 is stronger than that from 702, the subscriber-station 703 sends a pilot strength report message to the current base station 702 (step 1104). In response, the base station 702 starts handing-off the subscriber-station 703 by assigning an individual broadcast channel (556, FIG. 5C) of the base station 704, which the subscriber-station receives in step 1106. This assignment constitutes an instruction for the subscriber-station 703 to start receiving the subject broadcast program on this new individual broadcast channel 751 instead of the shared channel 750. Accordingly, the subscriber-station 703 resumes broadcast reception upon the new channel 751 in step 1108. This ends the sequence 1100.

SUBSCRIBER-STATION OPERATIONS,
INDIVIDUAL-TO-SHARED TRANSITION, $1^{ST}$
EXAMPLE

Figure 12:
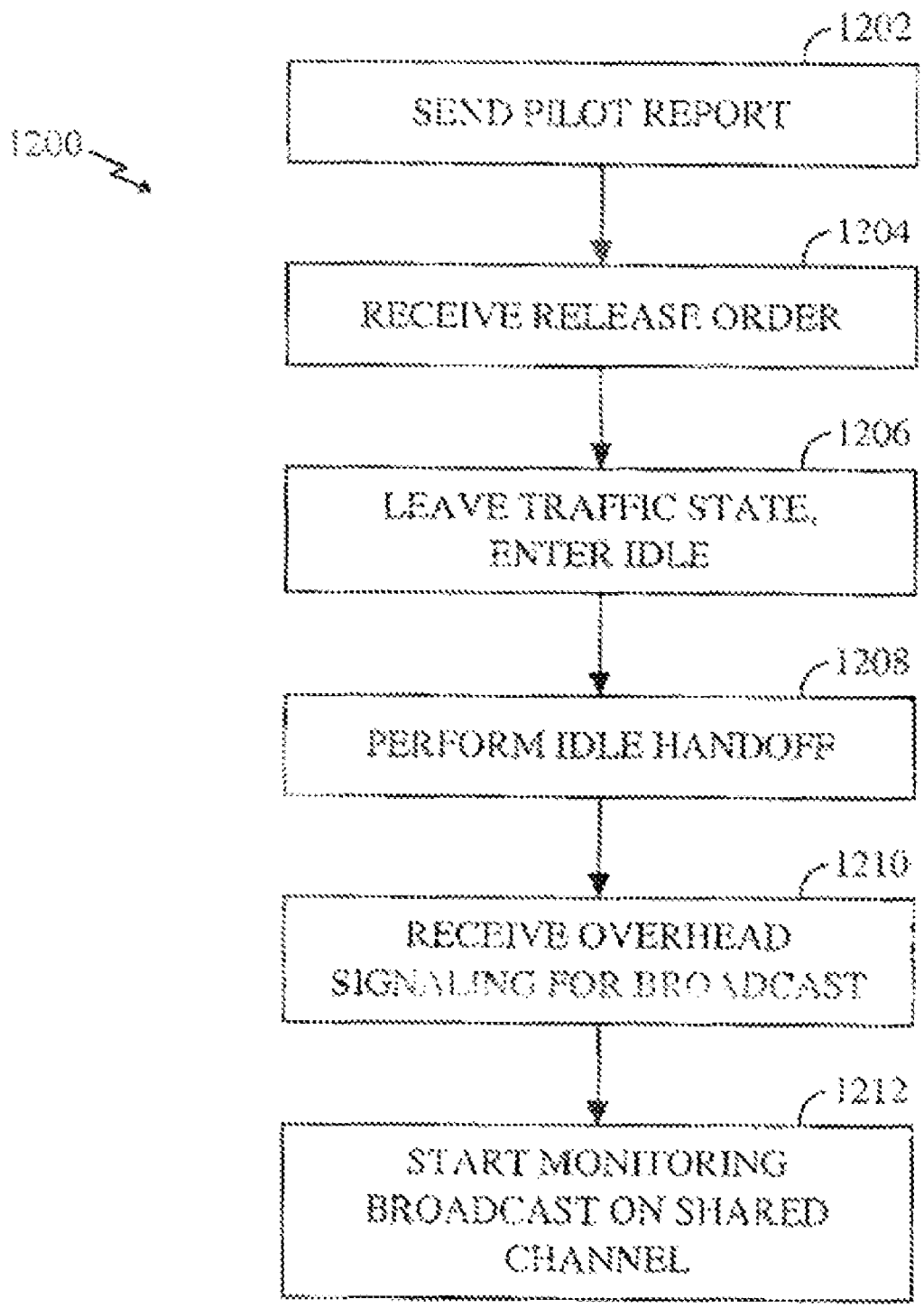
FIGS. 12-13 are flowcharts describing subscriber-station operations involved in transitioning from a first base station (transmitting a broadcast program on individual channels) to a second base station (transmitting the program on a shared broadcast channel).

FIG. 12 shows the operations 1200 performed by a subscriber-station in transferring from individual delivery of a broadcast program by one base station, to shared delivery of the broadcast program by another base station. Without any intended limitation, FIG. 12 is illustrated in the context of base stations 706, 708 from FIG. 7B and various channels from FIGS. 5B-5D. As mentioned above, the subscriber-station 707 is initially receiving the subject broadcast program upon the individual communications channel 752. As for the base station 708, this station is already delivering this same broadcast program on the shared broadcast channel 753. Briefly, in this embodiment, the first base station 706 does not aid in handing-off the subscriber-station 707 to the base station 708. The operation of the subscriber-station 707 in this embodiment, depicted by the sequence 1200 of FIG. 12, corresponds to the base station operations of FIGS. 9A-9B.

In step 1202, the subscriber-station 707 self-evaluates the pilot signals (not shown) from the base stations 706, 708. Recognizing that the pilot signal from the base station 708 is stronger than that from 706, the subscriber-station 707 sends a pilot strength report message to the current base station 702 (step 1202). In response, the base station 706 releases the subscriber-station 707 by sending a release order, which the subscriber-station receives in step 1204. Accordingly, the subscriber-station 707 leaves the TRAFFIC state and enters IDLE (FIG. 5A), which occurs in step 1206. This terminates the point-to-point call 752 (556, FIG. 5D) containing the subject broadcast program.

Due to termination of the connection 752 and the subscriber-station's recognition (from step 1202) that the pilot signal from the base station 708 is becoming stronger, the subscriber-station 707 conducts an idle handoff in step 1208. This is achieved by registering with the base station 708, thereby advising the base station 708 of the subscriber-station 707's presence. In step 1210, the subscriber-station 707 monitors the base station 708's overhead signaling channel 505 (FIG. 5B). In particular, the subscriber-station 707 monitors the repeating broadcast parameter signaling message (BPSM), which lists the broadcast programs available from the base station 708 and their various channels. The subscriber-station 707 monitors this message, listening for identification of the channel containing the desired broadcast program. In this present example, this information indicates that the broadcast channel containing the desired program is shared and also indicates its channel frequency or other identity. Accordingly, in step 1212 the subscriber-station 707 adjusts its transceiver to begin monitoring the shared channel 753 (channel 508, FIG. 5B).

SUBSCRIBER-STATION OPERATIONS, INDIVIDUAL-TO-SHARED TRANSITION, 2$^{nd}$ EXAMPLE

Figure 13:
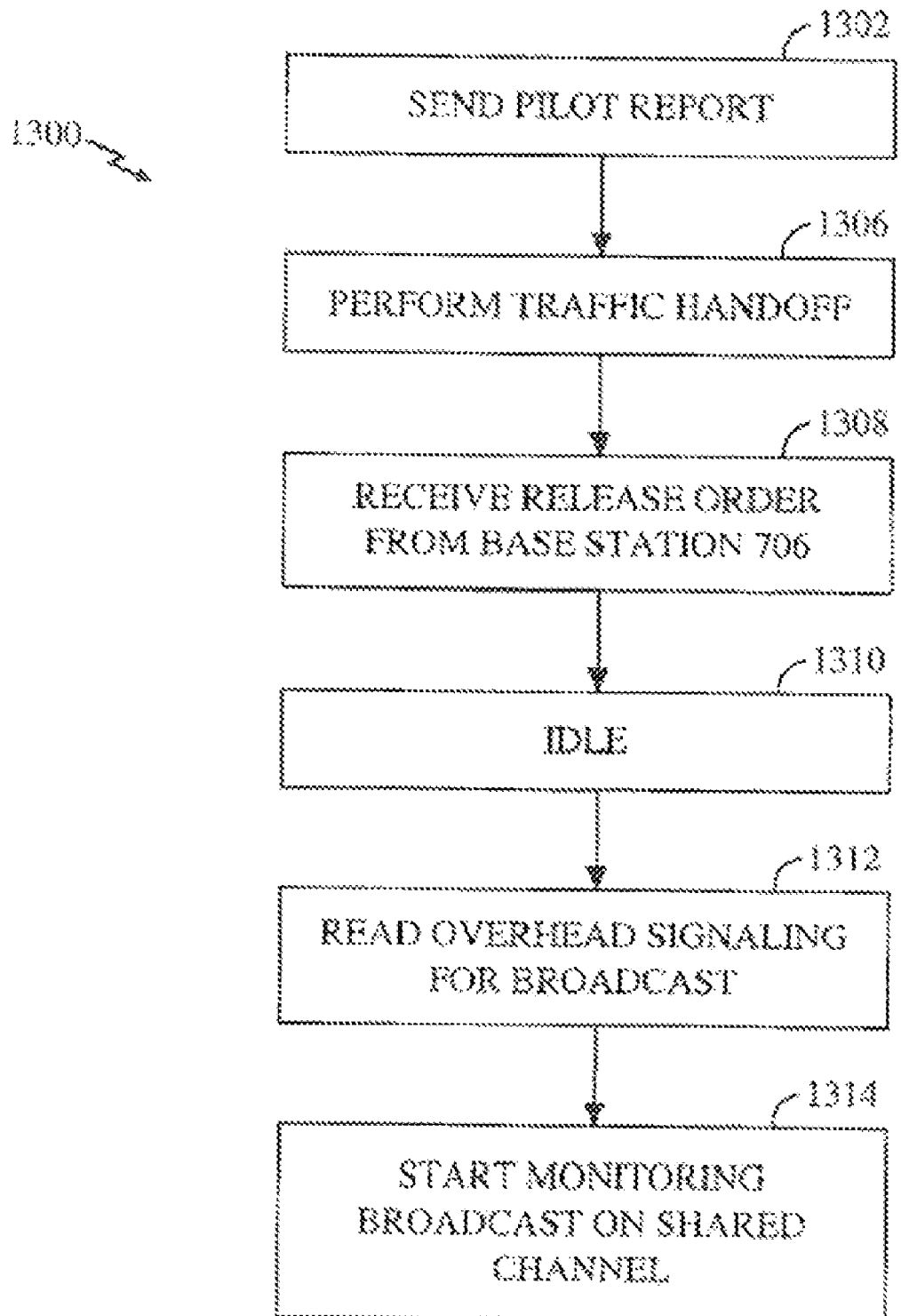

FIG. 13 shows a different example of operations 1300 performed by a subscriber-station in order to transfer from individual delivery of a broadcast program by one base station to shared delivery of the broadcast program by another base station. Without any intended limitation, FIG. 13 is illustrated in the context of base stations 706, 708 from FIG. 7B and various channels from FIGS. 5B-5D. As mentioned above, the subscriber-station 707 is initially receiving the subject broadcast program upon the individual communications channel 752. As for the base station 708, this station has already elected to utilize a shared broadcast channel 753 to deliver this program. Unlike the previous sequence 1200 (FIG. 12), in this embodiment, the first base station 706 does aid in handing-off the subscriber-station 707 to the base station 708. The operation of the subscriber-station 707 in this embodiment, depicted by sequence 1300 of FIG. 13, corresponds to base station operations of FIGS. 9C-9D.

In step 1302, the subscriber-station 707 sends a pilot strength report message to the current base station 706. Recognizing that the pilot signal from the base station 708 is stronger than that from 706 (according to the report), the base station 706 identifies the base station 708 for handoff, causing the subscriber-station 707 to undergo a traffic handoff to the base station 708 (step 1306). As mentioned above, with a traffic handoff any traffic connections (such as voice calls on 552/554) are continued from the base station 706 to the base station 708. Only the signaling portion 556b of the broadcast connection 556 is handed-off. After step 1306, the subscriber-station 707 receives a release order from the base station 708 (step 1308), for the channel 556b.

Resulting from step 1308, the subscriber-station 707 stops receiving the signaling information on 556b, completely ending the former point-to-point connection 752. Accordingly, the subscriber-station 707 enters the IDLE state in step 1310. While in IDLE, the subscriber-station 707 reads the overhead signaling (e.g., channel 505 of FIG. 5B) in search of the desired broadcast program (step 1312). More particularly, in step 1312 the subscriber-station 707 monitors the repeating broadcast parameters signal message as explained above. The subscriber-station 707 eventually receives information for the desired broadcast program, this information indicating that the program occurs on a shared broadcast channel and also indicating its channel frequency or other identity. Accordingly, in step 1314 the subscriber-station 707 adjusts its transceiver to begin monitoring the shared channel 753 (508 of FIG. 5B), thus receiving the desired broadcast program.

Change in Broadcast Channel Type Due to Initiation of Point-to-Point Call During Broadcast Over Shared Channel Introduction In contrast to the foregoing description, which details operations involved in changing between shared/individual broadcast channels due to subscriber-station transition from one base station to another, the following description concerns shared-to-individual and then individual-to-shared channel switch arising from the subscriber-station's receipt or placement of a point-to-point call unrelated to the broadcast.

Subscriber-Station Operation

Figure 14:
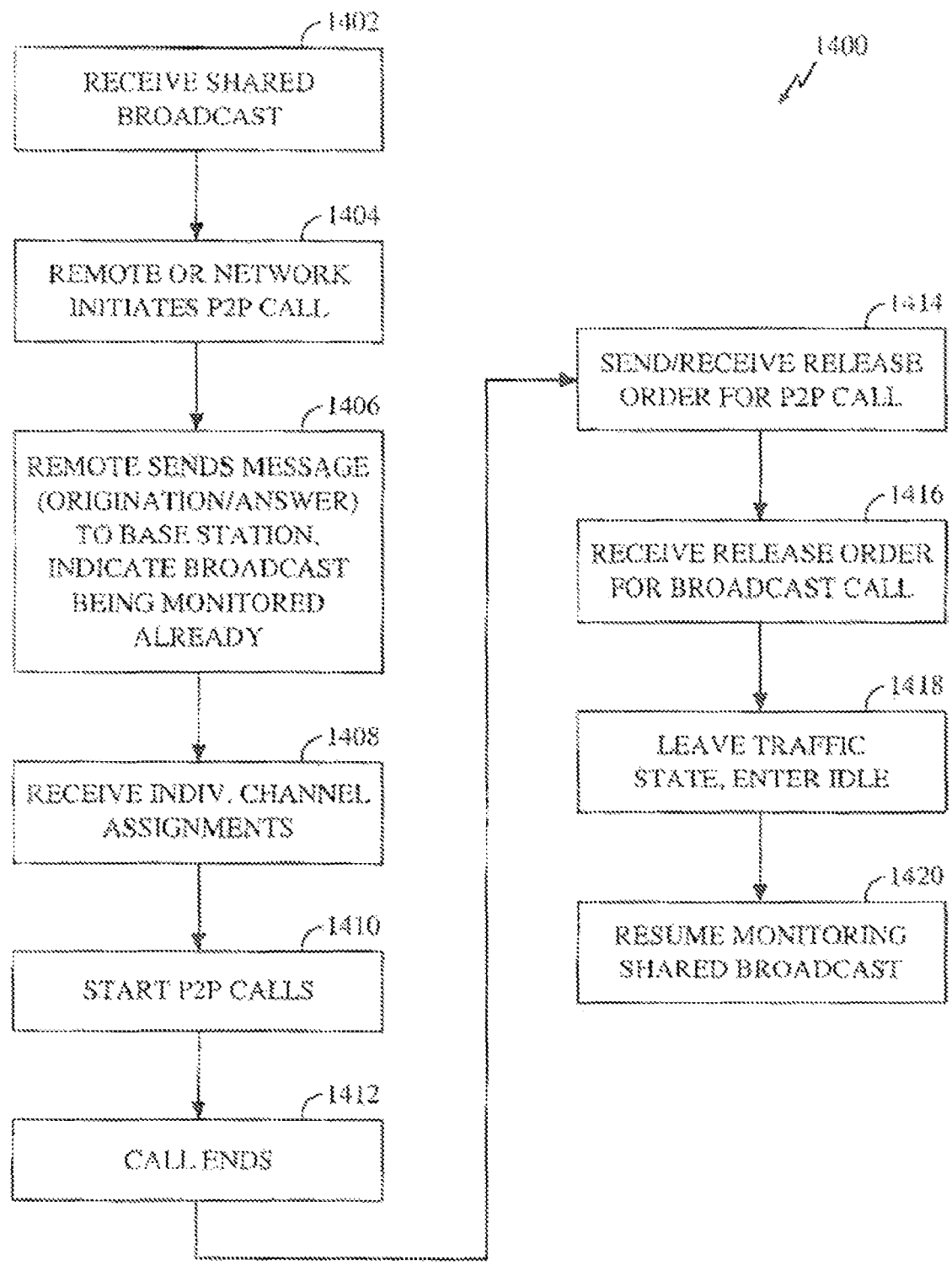
FIG. 14 is a flowchart showing operations performed by a subscriber-station when receiving broadcast content over a shared communications channel, and a point-to-point call is additionally initiated.

FIG. 14 describes operations 1400 performed by a subscriber-station to initiate a point-to-point call (such as a voice call) while the subscriber-station is already receiving a broadcast program over a shared channel. Without any intended limitation, this sequence is described in conjunction with the channels of FIGS. 5A-5D.

As described in greater detail below, this situation requires a change in broadcast channel type from shared to individual due to various reasons. During the TRAFFIC state 566, delivery of broadcast content concurrently with the point-to-point call 552/554 is necessarily conducted on a one-way point-to-point channel 556 rather than shared channel 508. This is chiefly because the signaling and control procedures that are required for proper operation of a subscriber-station are vastly different in IDLE versus TRAFFIC channels, and hence the subscriber-station can only be in one of these two states at any given time. Furthermore, many subscriber-stations are unable to communicate on more than one physical frequency at a time due to hardware structure. Therefore, since the individual traffic channel 552/554 is used to carry the user's requested point-to-point call, the exchange of any broadcast information during this time necessarily occurs on an individual channel 556 as well.

Sequence 1400 starts with the subscriber-station already receiving broadcast content over a shared channel, such as 508, FIG. 5B (step 1402). In step 1404, a point-to-point call is initiated, either by the subscriber-station user placing the call or by the wireless network completing an outside call from another wireless subscriber, PSTN user, or Internet user to the subscriber-station. Therefore, this call may be incoming or outgoing with respect to the subscriber-station. In the case of an outgoing call, step 1404 involves the subscriber-station receiving user input comprising keypad or other instructions to start the call; in the case of an incoming call, step 1404 does not involve any action by the subscriber-station and this step is included merely for the sake of illustration and completeness.

In step 1406, the subscriber-station sends an origination message (for an outgoing call) or an answer message (for an incoming call). The origination/answer message is conducted on the access channel 522 (FIG. 5C), and may utilize conventional formatting according to CDMA-2000 or other wireless protocol. Nevertheless, the origination/answer message also includes additional information indicating that the subscriber-station is already monitoring a broadcast program on a shared channel, and an identification of the particular broadcast content; this aids the base station in maintaining the broadcast connection.

Next, in step 1408, the subscriber-station receives channel assignments, including (1) assignment of an individual broadcast channel 556 (FIG. 5D) from the base station to continue the broadcast connection, and (2) assignment of a traffic channel 552/554 (FIG. 5D) to conduct the new point-to-point call. After step 1408, the subscriber-station adjusts its transceiver to engage in the TRAFFIC state for two point-to-point calls, one occurring on the traffic channel 552/554 and the other occurring on the broadcast channel 556.

In step 1412, the non-broadcast point-to-point call ends, by the subscriber-station user terminating the call, by the other party ending the call, or by a dropped call. In step 1414, a release order for the non-broadcast call is sent by the subscriber-station (if the subscriber-station terminated the call) or received by the subscriber-station (if the network or other party terminated the call). The release order is sent/received on a dedicated signaling channel such as 552*b* (FIG. 5D). Next, in step 1416 the subscriber-station receives a release order for the individual broadcast connection 556, which was sent by the base station in order to terminate the individual connection and resume broadcast on a cost-saving shared connection. In step 1418, the subscriber-station leaves the TRAFFIC state and enters IDLE in response to the release order from step 1416. In step 1420, the subscriber-station resumes receipt of the desired broadcast program by directing its transceiver to monitor the shared channel 508 that was originally being used in step 1402.

Base Station Operation

Figure 15:
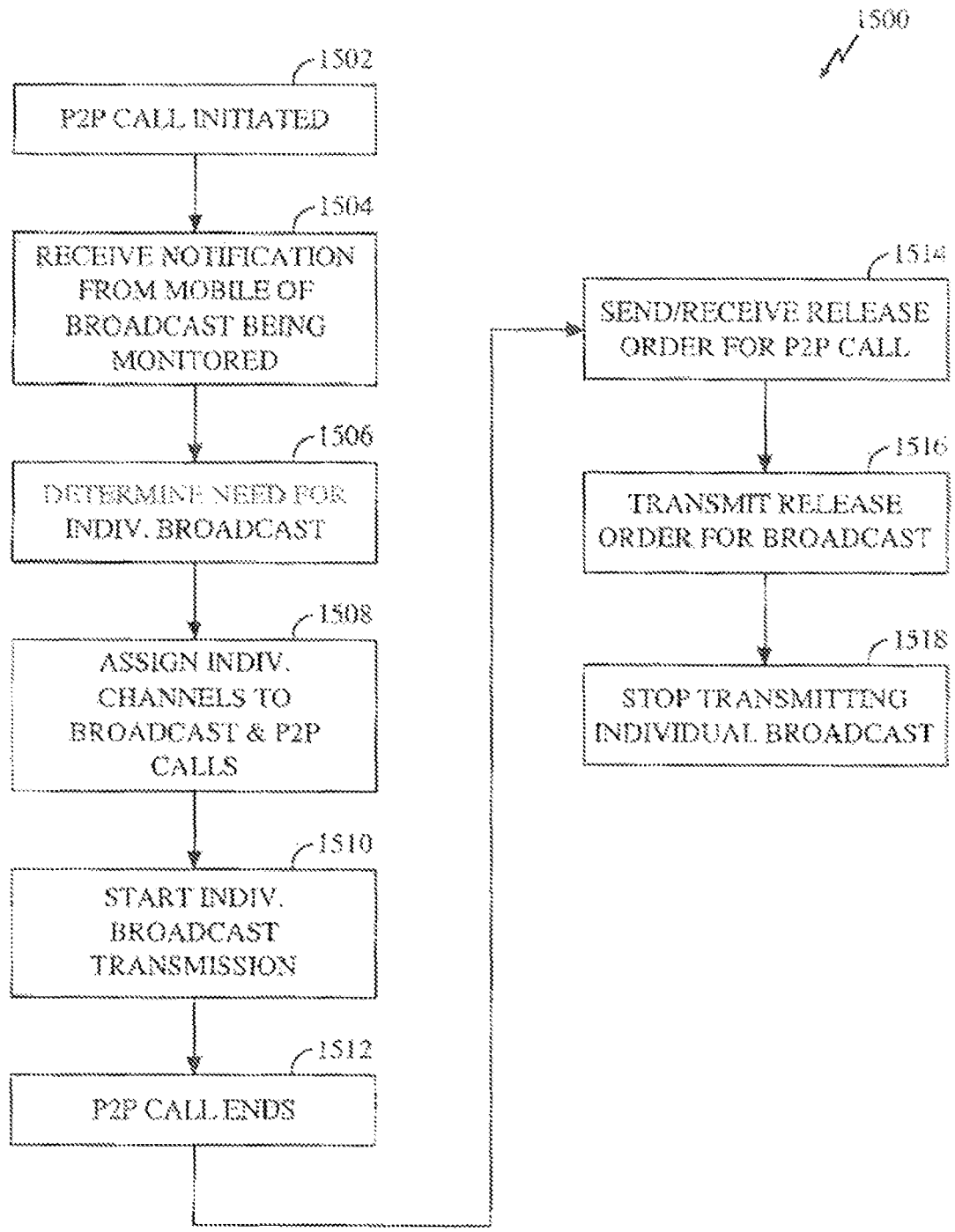
FIG. 15 is a flowchart showing operations of the base station corresponding to FIG. 14.

FIG. 15 describes operations 1500 performed by a base station to initiate a point-to-point call (such as a voice call) while the subscriber-station is already receiving a broadcast program on a shared channel. This sequence 1500, performed by the base station, corresponds to the sequence 1400 (FIG. 14) performed by a subscriber-station. Without any intended limitation, this sequence is described in conjunction with the channels of FIGS. 5B-5D.

The sequence 1500 starts with the subscriber-station already receiving broadcast content over a shared channel (such as 508, FIG. 5B). In step 1502, the base station learns that a point-to-point call has been initiated, either by the subscriber-station user sending an origination message to start the call or by the network forwarding an outside call from another source. In step 1504, the base station receives notification that the subscriber-station is monitoring a shared broadcast channel, and which channel. The notification of step 1504 arrives via the subscriber-station's origination or answer message, as applicable, occurring on the access channel 522 (FIG. 5C).

In step 1506 the base station analyzes the subscriber-station's origination/answer message, and therefore recognizes a continuing need to continue providing the broadcast program to the subscriber-station. Accordingly, in step 1508 the base station transmits one channel assignment message to the subscriber-station in order to identify a traffic channel 552/554 (FIG. 5D) for the new point-point-call, and another channel assignment message to identify a an individual channel 556 (FIG. 5D) for the broadcast content. In step 1510, the base station begins to transmit the desired broadcast program over the individual channel 556, and also carries the non-broadcast point-to-point connection on the traffic channel 552/554.

When the non-broadcast point-to-point call ends (step 1512), the base station in step 1514 either sends a release order for the non-broadcast connection (if the call is terminated by the network or other party), or receives a release order (if the call is terminated by the subscriber-station). Also in step 1514, the base station takes whatever additional action is needed to end the call. Next, the base station transmits a release order for the individual broadcast channel 556 (step 1516), and then stops transmitting the broadcast content on that channel (step 1518). From this point forward, the subscriber-station can monitor the base station's broadcast of the desired program on the applicable shared channel 508. This ends the sequence 1500.

Change in Broadcast Channel Type to Manage Network Resources

Introduction

In contrast to the foregoing description, which details operations involved in changing between shared/individual broadcast channels due to initiation of a point-to-point call, the following description concerns a shared-to-individual or individual-to-shared channel switch arising from a change in "network condition." As examples, network condition changes may involve a change in the number of broadcast subscribers served by a given base station, overall transmission power to subscribers served by, a given base station, or other network resource or other condition making it advantageous for a base station to switch between individual and shared broadcast of a program.

Base Station Operation

FIG. 16 shows operations 1600 performed by a base station (the "subject" base station) to switch between shared and individual broadcast channels (or vice versa) due to a change in network condition, or in other words, a change in consumption of network resources. Although different arrangements may be used, the illustrated sequence 1600 is performed for one broadcast program (the "subject" program), and the sequence 1600 may be repeated in series or parallel as needed to evaluate network resource consumption for other broadcast programs.

In step 1602, the base station examines the network condition. Although network condition may be defined in many different ways, depending upon the nature of the application hardware and software, some exemplary network conditions include a base station's overall transmission power output, the number of subscriber-stations receiving individual broadcasts of the subject program, the availability of Walsh codes to the subject base station, and the like. As for Walsh codes, each call being assigned in the system uses one or more physical channels, and each physical channel is transmitted via one or more Walsh Codes. Walsh Codes are used to ensure the different transmissions can be received separately at the mobile station and do not interfere with each other. The number of Walsh Codes available in each sector is therefore fixed and hence availability changes dynamically as calls are setup or released.

In step 1604, the subject base station determines whether there has been a change in network condition, for instance beyond a prescribed threshold, percentage, cutoff, level, or other measure. If there has been no change in network condition, or the change is insignificant, the base station waits (step 1606) and then re-examines network condition in step 1602. Step 1602 may incorporate hysteresis or other technique to avoid inefficiently thrashing between individual/shared broadcasts.

When network condition change sufficiently, step 1604 proceeds to steps 1608-1614 (if the network condition now favors using individual broadcast channels instead of a shared channel to deliver the subject program), or to steps 1616-1624 (if the network condition now favors using a shared broadcast channel instead of individual channels to deliver the subject program).

In step 1608, the base station notifies its subscriber-stations of its impending change to the use of individual broadcast channels. For example, this message may be conveyed to subscriber-stations using the paging channel 506 (FIG. 5C), which is monitored by subscriber-stations during their shared broadcasts. In response, the subscriber-stations respond (not shown) with an indication of whether they wish to continue receiving the current broadcast. The base station may receive these responses, for example, on the access channel 522 (FIG. 5C). Although separate messages may be sent to individual subscriber-stations in step 1608, these messages may alternatively be consolidated into a single "group page." One variety of group paging is taught by U.S. patent application Ser. No. 10/192,428, filed on Jul. 9, 2002 and entitled "METHOD AND SYSTEM FOR MULTICAST SERVICE INITIATION IN A COMMUNICATION SYSTEM." The entirety of the foregoing reference is hereby incorporated by reference into the present disclosure.

Next, the base station analyzes (1610) responses received from the subscriber-stations, and then assigns (1612) individual broadcast channels 556 (FIG. 5D) to each subscriber-station that indicated an interest in continuing to receive the subject broadcast program. Then, in step 1614, the base station resumes its broadcast by transmitting upon the individual channels 556, a different one for each subscriber-station receiving the subject broadcast program. After step 1614, the routine returns to step 1604.

In contrast with the sequence 1608-1614, step 1616 starts a sequence 1616-1624 that changes from individual to shared broadcast channels. In step 1616, the base station considers a first ("current") one of the subscriber-stations receiving the broadcast program on an individual channel from the base station. For this subscriber-station, the base station announces the intent to release the individual broadcast channel 556, and advises the subscriber-station that the broadcast is continued on a specified shared broadcast channel 508. The base station may transmit the messages of step 1618, for example, upon the respective signaling channel 556b associated with broadcast content 556a FIG. 5D). Alternatively, step 1618 may be achieved with a group page as mentioned above. In step 1620, the base station releases the individual broadcast channel 556 (FIG. 5D) used by the current subscriber-station by sending a release command via the channel 556b.

Next, the base station in step 1622 considers whether there are any remaining subscriber-stations to inform and release, and if so, it returns to step 1618. If step 1618 was implemented with group page, then step 1622 returns to step 1620 instead of 1618. If no subscriber-stations remain, the base station starts transmitting the subject program on the specified shared channel in step 1624. The base station also updates contents of the overhead signal 505 (FIG. 5B) so that the broadcast parameter signaling message indicates that the subject content is available on the specified shared channel. If desired, step 1624 may be performed earlier (e.g., before step 1618) to prevent any possible interruption of service. Step 1624 returns to step 1604.

Subscriber-Station Operation—Change from Shared to Individual

FIG. 17 shows operations 1700 performed by a subscriber-station (the "subject" subscriber-station) to switch from shared to individual broadcast channel in accordance with the base station's performance of steps 1608-1614 (FIG. 16). When the sequence 1700 starts, the subscriber-station is receiving a broadcast program on an individual broadcast channel.

In step 1702, the subject subscriber-station receives the base station's notification that the individual broadcast is ending and resumption will occur on a shared channel. As mentioned above, this notification is received on a channel such as the paging channel 506 (FIG. 5C), which the subscriber-station monitors while in the IDLE and ACCESS states. In step 1704, the subscriber-station may query its user or consult a default setting to determine whether there is interest in continuing to receive the broadcast on a shared channel. Accordingly, in step 1704, the subscriber-station sends a message, for example on the access channel 522 (FIG. 5C), indicating the subscriber-station's interest (or not) in continuing to receive the broadcast program on the shared channel.

If the subscriber-station elected to continue receiving the broadcast in step 1704, then step 1706 is performed. Here, the subscriber-station receives a channel assignment from the base station, which the base station sent in step 1612 (FIG. 16). Next, the subscriber-station adjusts its transceiver to the assigned channel (508) in step 1708, thereby entering the TRAFFIC state in regard to this channel, thereby continuing receipt of the broadcast content in a point-to-point call. This ends the sequence 1700.

Subscriber-Station Operation—Change from Individual to Shared

FIG. 18 shows operations 1800 performed by a subscriber-station (the "subject" subscriber-station) to switch from individual to shared broadcast channels in accordance with the base station's performance of steps 1616-1624.

When the sequence 1800 begins, the subject subscriber-station is receiving a broadcast program on an individual channel such as 556 (FIG. 5D). In step 1802, the subject subscriber-station receives notification of the base station's intent to release this individual broadcast channel. The subscriber-station also receives the base station's notification that broadcast is continued on a specified, shared broadcast channel 508. In step 1804, the subscriber-station receives the base station's order releasing the individual broadcast channel 556. The subscriber-station may receive the messages of steps 1802, 1804, for example, on the dedicated channel 556b (FIG. 5D).

In response to the release order of step 1804, the subscriber-station leaves the TRAFFIC state and enters IDLE (step 1806). At this point, the subscriber-station's reception of the specified broadcast program over the individual channel 556 terminates. To continue reception, the subscriber-station in step 1808 monitors the overhead signaling channel 505 (FIG. 5B), and in particular the broadcast parameter signaling message, to determine which shared broadcast channel contains the desired broadcast program. In the present case, the base station has updated this message (step 1624, FIG. 16) to indicate that the broadcast content is available on a specified shared broadcast channel 508. Accordingly, the subscriber-station in step 1810 adjusts its transceiver to monitor the specified shared channel 508, and thereby start to receive the desired broadcast content. This ends the sequence 1800.

Other Embodiments

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method of operating a wireless subscriber-station in a wireless communications network, comprising operations of:
   receiving broadcast content from a first base station over a first communication channel of a type of one of a shared channel for use by multiple subscriber-stations or an individual channel dedicated for use by an individual subscriber-station;
   in response to one or more events of one or more prescribed types, the subscriber-station switching based on assistance from the first base station from reception of the broadcast content over one type of communication channel over the first communication channel to reception of the broadcast content from a second base station over a second communication channel of another type.

2. The method of claim 1, where one of the types of events comprises:
   receiving instruction from one or more base stations.

3. The method of claim 1, where one of the types of events comprises:
   while receiving given broadcast content, the subscriber-station transitioning from the first base station to the second base station;
   where the first and second base stations are transmitting the given broadcast content on communication channels of different types.

4. The method of claim 3, where the operations further comprise:
   the subscriber-station maintaining the first communication channel to receive the broadcast content while establishing the second communication channel to receive the broadcast content.

5. The method of claim 1, where one of the types of prescribed events comprises establishment of a point-to-point call to which the subscriber-station is one party while the subscriber-station is receiving broadcast content from a base station upon a shared channel.

6. The method of claim 5, where another one of the types of prescribed events comprises conclusion of the point-to-point call.

7. The method of claim 1, where:
   the switching operation comprises, responsive to establishment of a point-to-point call having the subscriber-station as one party while the subscriber-station is receiving broadcast content upon a shared channel, switching from reception of the broadcast content upon the shared channel to reception of the broadcast content upon an individual channel;
   the operations further comprise, responsive to completion of the call, the subscriber-station resuming receipt of the subject broadcast content upon the shared channel.

8. A wireless subscriber-station apparatus, comprising:
   a multichannel transceiver;
   a manager coupled to components including the transceiver to manage operation of the components and to perform operations to manage the receipt of broadcast content services, the operations comprising:
   receiving broadcast content from a first base station over a first communication channel of a type of one of a shared channel for use by multiple subscriber-stations or an individual channel dedicated for use by an individual subscriber-station;
   in response to one or more events of one or more prescribed types, the subscriber-station switching based on assistance from the first base station from reception of broadcast content over one type of communication channel over the first communication channel to reception of the broadcast content from a second base station over a second communication channel of another type.

9. The apparatus of claim 8, where one of the types of events comprises:
   receiving instruction from one or more base stations.

10. The apparatus of claim 8, where one of the types of events comprises:
    while receiving given broadcast content, the subscriber-station transitioning from the first base station to the second base station;

where the first and second base stations are transmitting the given broadcast content on communication channels of different types.

11. The apparatus of claim 10, where the operations further comprise:
the subscriber-station maintaining the first communication channel to receive the broadcast content while establishing the second communication channel to receive the broadcast content.

12. The apparatus of claim 8, where one of the types of prescribed events comprises establishment of a point-to-point call to which the subscriber-station is one party while the subscriber-station is receiving broadcast content from a base station upon a shared channel.

13. The apparatus of claim 12, where another one of the types of prescribed events comprises conclusion of the point-to-point call.

14. The apparatus of claim 8, where:
the switching operation comprises, responsive to establishment of a point-to-point call having the subscriber-station as one party while the subscriber-station is receiving broadcast content upon a shared channel, switching from reception of the broadcast content upon the shared channel to reception of the broadcast content upon an individual channel;
the operations further comprise, responsive to completion of the call, the subscriber-station resuming receipt of the subject broadcast content upon the shared channel.

15. A wireless subscriber-station apparatus, comprising:
first means for multichannel transceiving;
second means for managing operation of components including the first means and for performing operations to manage the receipt of broadcast content services, the operations comprising:
receiving broadcast content from a first base station over a first communication channel of a type of one of a shared channel for use by multiple subscriber-stations or an individual channel dedicated for use by an individual subscriber-station;
in response to one or more events of one or more prescribed types, the subscriber-station switching based on assistance from the first base station from reception of broadcast content over one type of communication channel over the first communication channel to reception of the broadcast content from a second base station over a second communication channel of another type.

16. An non-transitory signal bearing medium tangibly embodying a program of machine-readable instructions executable by a digital data processor to perform operations to operating a wireless subscriber-station in a wireless communications network, the operations comprising:
receiving broadcast content from a first base station over a first communication channel of a type of one of a shared channel for use by multiple subscriber-stations or an individual channel dedicated for use by an individual subscriber-station;
in response to one or more events of one or more prescribed types, the subscriber-station switching based on assistance from the first base station from reception of broadcast content over one type of communication channel over the first communication channel to reception of the broadcast content from a second base station over a second communication channel of another type.

17. A method of operating a wireless subscriber-station in a wireless communications network, comprising operations of:
receiving broadcast content from a first base station over a first communication channel of a type of one of a shared channel for use by multiple subscriber-stations or an individual channel dedicated for use by an individual subscriber-station; and
switching based on assistance from the first base station from reception of broadcast content over one type of communication channel over the first communication channel to reception of the broadcast content from a second base station over a second communication channel of another type.

18. A method of operating a wireless subscriber-station in a wireless communications network, comprising operations of:
receiving broadcast content from a first base station over a first communication channel of a type of one of a shared channel for use by multiple subscriber-stations or an individual channel dedicated for use by an individual subscriber-station; and
receiving the broadcast content from a second base station over a second communication channel of another type based on assistance from the first base station.

* * * * *